(12) United States Patent
Kang et al.

(10) Patent No.: US 9,619,885 B2
(45) Date of Patent: Apr. 11, 2017

(54) DIGITAL DEVICE AND METHOD FOR PROCESSING THREE DIMENSIONAL IMAGE THEREOF

(71) Applicant: LG ELECTRONICS INC., Seoul (KR)

(72) Inventors: Jinwon Kang, Seoul (KR); Yunsup Shin, Seoul (KR); Youngman Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 14/538,278

(22) Filed: Nov. 11, 2014

(65) Prior Publication Data

US 2015/0130908 A1 May 14, 2015

Related U.S. Application Data

(60) Provisional application No. 61/903,364, filed on Nov. 12, 2013.

(30) Foreign Application Priority Data

Oct. 27, 2014  (KR) .......................... 10-2014-0146171

(51) Int. Cl.
*H04N 13/00* (2006.01)
*G06T 7/00* (2017.01)
(Continued)

(52) U.S. Cl.
CPC ............ *G06T 7/0051* (2013.01); *G06T 7/408* (2013.01); *H04N 13/021* (2013.01);
(Continued)

(58) Field of Classification Search
CPC ....................... H04N 13/0285; H04N 13/0289
(Continued)

(56) References Cited

U.S. PATENT DOCUMENTS

| | | | |
|---|---|---|---|
| 2009/0213240 A1* | 8/2009 | Sim | ......................... G06T 17/00 348/222.1 |
| 2013/0050425 A1* | 2/2013 | Im | ...................... H04N 13/0207 348/46 |

(Continued)

FOREIGN PATENT DOCUMENTS

| | | |
|---|---|---|
| CN | 1723564 A | 1/2006 |
| CN | 102130139 A | 7/2011 |

(Continued)

*Primary Examiner* — Jeffery Williams
(74) *Attorney, Agent, or Firm* — Dentons US LLP

(57) ABSTRACT

The present invention relates to a digital device capable of obtaining both a color image and a depth image and a method of processing a three dimensional image using the same. The method can include the steps of switching a resolution of a light-receiving unit from a first resolution to a second resolution which is lower than the first resolution, sensing a visible light and an infrared light from a prescribed subject, extracting color image information from the visible light sensed by a first sensing unit of the light-receiving unit during a first time, extracting depth image information from the infrared light sensed by a second sensing unit of the light-receiving unit during a second time, determining whether extraction of both the color image information and the depth image information for the subject is completed and if the extraction of the color image information and the extraction of the depth image information for the subject are completed, implementing a 3D image of the subject based on the extracted color image information and the depth image information.

20 Claims, 38 Drawing Sheets

(51) Int. Cl.
*H04N 13/02* (2006.01)
*G06T 7/40* (2017.01)

(52) U.S. Cl.
CPC ..... *H04N 13/0214* (2013.01); *H04N 13/0253* (2013.01); *H04N 13/0257* (2013.01); *H04N 13/0271* (2013.01); *H04N 13/0285* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 2013/0107005 | A1* | 5/2013 | Lim | H04N 5/33 348/46 |
| 2013/0222553 | A1* | 8/2013 | Tsuchita | H01L 27/14627 348/49 |
| 2013/0258112 | A1* | 10/2013 | Baksht | H04N 5/04 348/164 |

FOREIGN PATENT DOCUMENTS

| | | | |
|---|---|---|---|
| CN | 102638692 | A | 8/2012 |
| CN | 102791509 | A | 11/2012 |
| CN | 102934025 | A | 2/2013 |
| CN | 103430557 | A | 12/2013 |

\* cited by examiner

FIG. 4a

| | | | |
|---|---|---|---|
| R | G | R | G |
| IR | B | IR | B |
| R | G | R | G |
| IR | B | IR | B |

1100

(a)

(a)

(b)

(a)

DIGITAL DEVICE AND METHOD FOR PROCESSING THREE DIMENSIONAL IMAGE THEREOF

Pursuant to 35 U.S.C. §119(a), this application claims the benefit of earlier filing date and right of priority to Korean Patent Application No. 10-2014-0146171, filed on Oct. 27, 2014, the contents of which are hereby incorporated by reference herein in their entirety.

Pursuant to 35 U.S.C. §119(e), this application also claims the benefit of U.S. Provisional Application Ser. No. 61/903,364, filed on Nov. 12, 2013, the contents of which are hereby incorporated by reference in their entirety.

BACKGROUND OF THE INVENTION

Field of the Invention

The present invention relates to a digital device processing a three dimensional image, and more particularly, to a digital device capable of capturing both a color image and a depth image and a method of processing a three dimensional image using the same.

Discussion of the Related Art

Generally, a digital device processing a 3 dimensional image can include a color camera configured to capture a color image and a depth camera configured to capture a depth image.

In this case, the color camera corresponds to a camera equipped with a CCD (charge coupled device) or a CMOS (complementary metal oxide semiconductor). The color camera can capture a two dimensional color image of a subject by sensing a visible light reflected from the subject that receives a sun light or a flash light.

The depth camera can capture a depth image of a subject by shining such a light as a laser beam, infrared light and the like to the subject and obtaining a light reflected from the subject.

In this case, a depth may indicate a distance to the subject from the depth camera.

Subsequently, a three dimensional image of the subject can be obtained using the captured two dimensional color image and the depth image.

Yet, since a digital device processing a three dimensional image should drive a color camera configured to capture a color image and a depth camera configured to capture a depth image, respectively, configuration of the digital device may be complex, image processing time may take a long time and overall cost may increase as well.

Hence, it is required to have a digital device processing a three dimensional image capable of capturing both a color image and a depth image in the future.

SUMMARY OF THE INVENTION

Accordingly, the present invention is directed to an apparatus and method thereof that substantially obviate one or more problems due to limitations and disadvantages of the related art.

One technical task intended by one embodiment of the present invention is to provide a digital device of a simple structure using a light-receiving unit capable of capturing both a color image and a depth image and a method of processing a three dimensional image using the same.

Another technical task intended by one embodiment of the present invention is to provide a digital device capable of improving contrast of a depth image by increasing exposure time of an infrared light, which is increased by converting resolution of a light-receiving unit from a first resolution to a second resolution which is lower than the first resolution, and a method of processing a three dimensional image using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method for a digital device to process a three dimensional image includes the steps of switching a resolution of a light-receiving unit from a first resolution to a second resolution which is lower than the first resolution, sensing a visible light and an infrared light from a prescribed subject, extracting color image information from the visible light sensed by a first sensing unit of the light-receiving unit during a first time, extracting depth image information from the infrared light sensed by a second sensing unit of the light-receiving unit during a second time, determining whether extraction of both the color image information and the depth image information for the subject is completed and if the extraction of the color image information and the extraction of the depth image information for the subject are completed, implementing a 3D image of the subject based on the extracted color image information and the depth image information.

To further achieve these objects and other advantages and in accordance with the purpose of the invention, as embodied and broadly described herein, according to one embodiment, a digital device can include a receiving unit configured to receive a 2 dimensional (2D) or a 3 dimensional (3D) image mode request signal, a light-receiving unit configured to include a first sensing unit sensing a visible light corresponding to a visible area of a light spectrum and a second sensing unit sensing an infrared light corresponding to an infrared area of the light spectrum from a prescribed subject, an image processing unit configured to extract color image information from the first sensing unit during a first time and extract depth image information from the second sensing unit during a second time, a 3D image implementing unit configured to implement a 3D image of the subject based on the extracted color image information and the depth image information and a control unit, if the 3D image mode request signal is received, configured to check a resolution mode of the light-receiving unit, the control unit, if a resolution of the light-receiving unit corresponds to a first resolution, configured to switch the resolution of the light-receiving unit from the first resolution to a second resolution which is lower than the first resolution, the control unit configured to control the light-receiving unit, the image processing unit and the 3D image implementing unit.

According to one embodiment of the present invention, since both a color image and a depth image can be processed at the same time using a light-receiving unit including a first sensing unit configured to sense a visible light and a second sensing unit configured to sense an infrared light, a digital device can be simply configured and three dimensional image processing time and overall cost can be reduced.

According to one embodiment of the present invention, depth of a three dimensional image can be improved by enhancing sensitivity and contrast of a depth image in a manner of increasing exposure time of an infrared light between end time of a previous frame and a start time of a next frame of color image information, which is increased by converting resolution of a light-receiving unit from a first resolution to a second resolution lower than the first resolution.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4a-4b are a diagram for a bayer pattern according to a light-receiving unit shown in FIG. 3;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, various embodiments according to the present invention are explained with reference to attached drawings.

Figure 1:
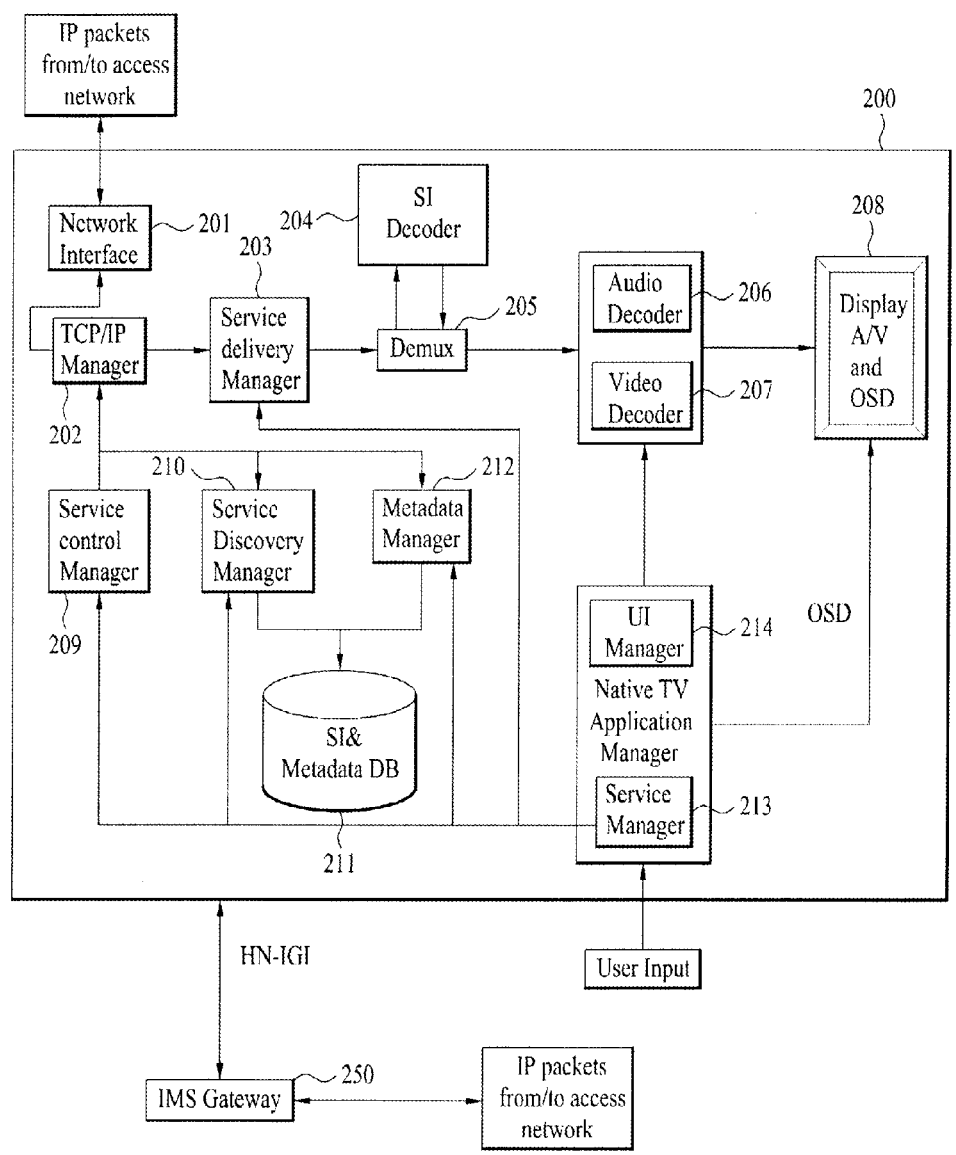
FIG. 1 is a block diagram for explaining a digital device according to one embodiment of the present invention.

FIG. 1 is a schematic diagram of a digital receiver according to an embodiment of the present invention.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

Figure 2:
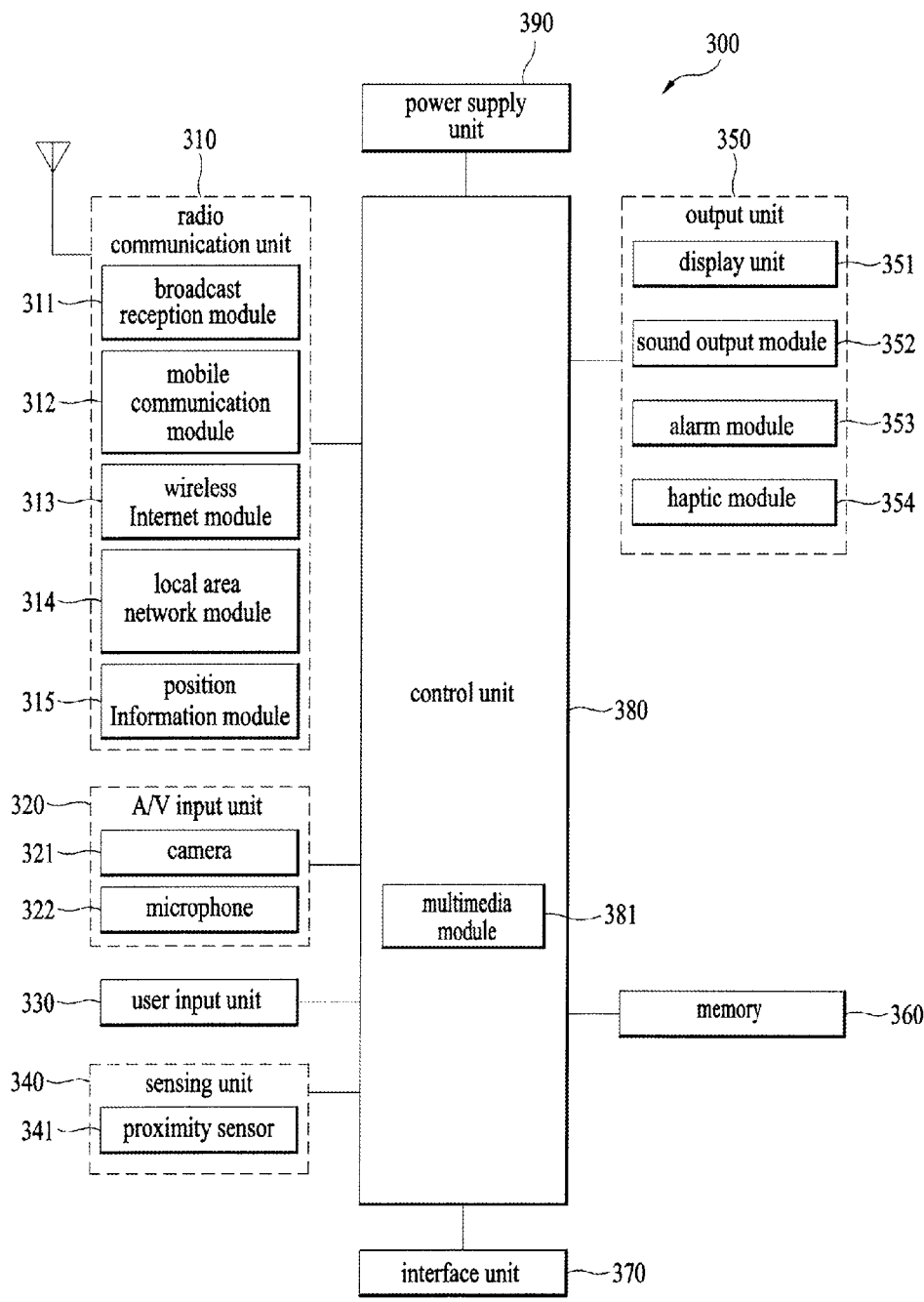
FIG. 2 is a block diagram for explaining a digital device according to a different embodiment of the present invention.
Figure 3:
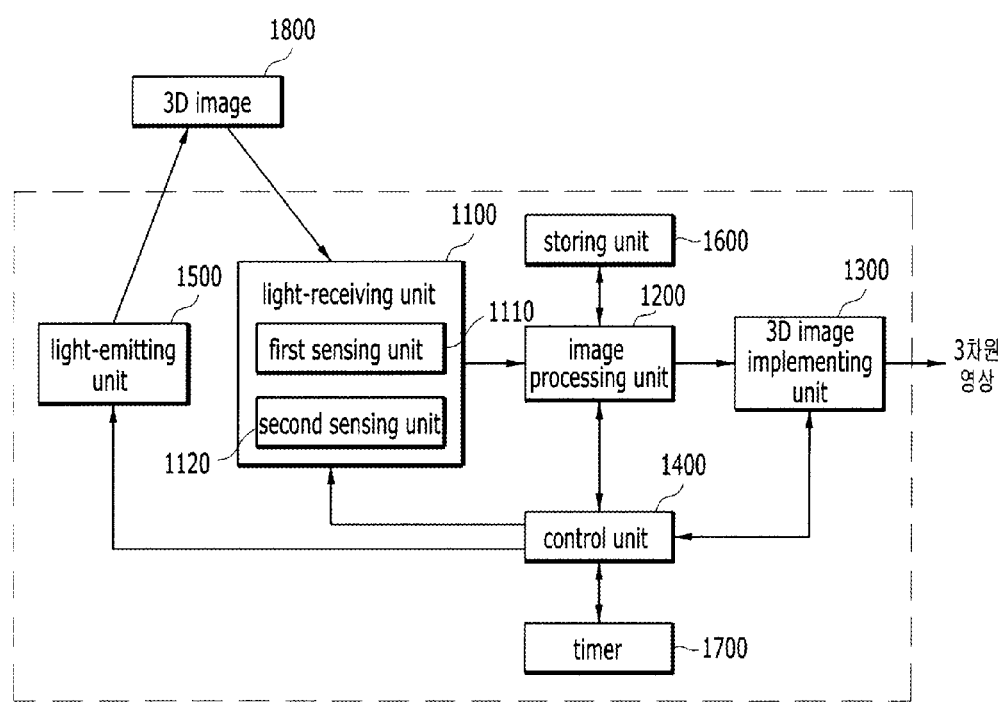
FIG. 3 is a block diagram for a three dimensional image processing device of a digital device according to the present invention.

FIG. 2 is a block diagram of a mobile terminal in accordance with an embodiment of the present invention. With reference to FIG. 2, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 2, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

FIG. 3 is a block diagram for a three dimensional (3D) image processing device of a digital device according to the present invention.

As shown in FIG. 3, a 3D image processing device of a digital device can include a light-receiving unit 1100, an image processing unit 1200, a 3D image implementing unit 1300, a control unit 1400, a light-emitting unit 1500 and a storing unit 1600.

Additionally, the 3D image processing device of the digital device may further include a timer 1700.

In this case, the light-receiving unit 1100 can receive a visible light corresponding to a visible area of a light spectrum and an infrared light corresponding to an infrared area of the light spectrum.

In some cases, the light-receiving unit 1100 may include a first sensing unit 1110 and a second sensing unit 1120.

In this case, the first sensing unit 1110 of the light-receiving unit 1100 can sense a visible light corresponding to a visible area of a light spectrum. For instance, the first sensing unit 1110 of the light-receiving unit 1100 can sense a light including a wavelength range ranging from about 350 nm to 700 nm.

The second sensing unit 1120 of the light-receiving unit 1100 can sense an infrared light corresponding to an infrared area of a light spectrum. For instance, the second sensing unit 1120 of the light-receiving unit 1100 can sense an infrared light including a wavelength range over 700 nm.

The light-receiving unit 1100 can switch to a high resolution mode or a low resolution mode according to a control signal of the control unit 1400.

As an example, the low resolution mode may have a resolution about 25% lower than that of the high resolution mode.

In this case, in case of implementing a 3D image, the light-receiving unit 1100 can switch to the low resolution mode from the high resolution mode according to a control signal of the control unit 1400.

And, in case of implementing a 2D image, the light-receiving unit 1100 can switch to the high resolution mode from the low resolution mode according to a control signal of the control unit 1400.

In some cases, in case of implementing a 2D image, the light-receiving unit 1100 may maintain the low resolution mode without switching to the high resolution mode from the low resolution mode according to a control signal of the control unit 1400.

When the light-receiving unit 1100 is switched to the low resolution mode, time taken for extracting depth image information or color image information extracted by the image processing unit 1200 may be identical to that of the high resolution mode.

As an example, when the image processing unit 1200 operates at 60 frames in the light-receiving unit 1100 of the low resolution mode, a space between frames may correspond to about $1/120$ second.

As mentioned in the foregoing description, according to the present invention, by arranging the light-receiving unit 1100 capable of receiving a visible light corresponding to a visible area of a light spectrum and an infrared light corresponding to an infrared area of the light spectrum from a prescribed subject 1800 at the same time, it is able to obtain both color image information obtained from the visible light and depth image information obtained from the infrared light at the same time.

Hence, according to the present invention, since it is able to process both the obtained color image information and the depth image information at the same time, configuration is simple and 3D image processing time and overall cost can be reduced.

The image processing unit 1200 extracts color image information from a first sensing unit 1110 during a first time and can extract depth image information from the first sensing unit 1110 and a second sensing unit 1120 during a second time.

As mentioned above, the image processing unit 1200 according to the present invention can obtain the color image information and the depth image information on timings different from each other instead of obtaining the informations at the same time.

In particular, according to the present invention, time of obtaining color image information obtained by the image processing unit 1200 and time of obtaining depth image information obtained by the image processing unit 1200 may be different from each other.

This is because a depth image processing method capable of enhancing sensitivity and contrast of a depth image should be independently performed by the image processing unit.

For instance, the image processing unit 1200 performs a binning process for the obtained color image information.

In this case, the binning process indicates that a new pixel is obtained by combining a plurality of pixels of the light-receiving unit 1100 with each other. Since two or more pixels are combined with each other, sensitivity and SNR (signal to noise ratio) become better compared to a case of obtaining the sensitivity and SNR by one pixel. Hence, a clear color image can be obtained in dark lighting.

And, the image processing unit 1200 performs a sub sampling process of infrared (IR) pixel for the obtained color image information.

In this case, the sub sampling process indicates a process of collecting depth information of IR pixels only from an IR frame. Since the depth information of the IR pixels are collected and outputted only, sensitivity and contrast of a depth image can be enhanced.

In some cases, when the image processing unit 1200 obtains color image information and depth image information individually, in case that the image processing unit 1200 obtains the depth image information, since the image processing unit 1200 can extract the depth image information from not only an infrared light received by the second sensing unit 1120 of the light-receiving unit 110 but also an infrared light received by the first sensing unit 1110 of the light-receiving unit 110, sensitivity and contrast of a depth image can be enhanced, thereby improving depth of a 3D image.

Hence, the image processing unit 1200 can individually perform a job of obtaining color image information and a job of obtaining depth image information in every unit pixel of the light-receiving unit 1100 including the first sensing unit 1110 and the second sensing unit 1120.

The 3D image implementing unit 1300 can implement a 3D image of a subject 1800 based on the color image information and the depth image information extracted from the image processing unit 1200.

The control unit 1400 can control the light-receiving unit 1100, the image processing unit 1200 and the 3D image implementing unit 1300.

In this case, having received a 3D image mode request signal, the control unit 1400 checks a resolution mode of the light-receiving unit 1100. If a resolution of the light-receiving unit 1100 corresponds to a first resolution, the control unit can switch the resolution of the light-receiving unit 1100 from the first resolution to a second resolution which is lower than the first resolution.

The resolution of the light-receiving unit 110 is switched to reduce a cross-talk.

In this case, the cross-talk corresponds to interference between an RGB frame in which color image information is obtained and an IR frame in which depth image information is obtained.

In particular, the IR frame needs IR lighting and the RGB frame does not need the IR lighting. When the IR lighting of the IR frame affects the RGB frame, noise or distortion occurs in an RGB image. This phenomenon is called the cross-talk.

Hence, in order not to give a cross-talk impact to RGB frames situating at before and after an IR frame, the IR lighting should be momentarily turned on.

Yet, if time of turning on the IR lighting is too short, the IR frame cannot recognize the IR lighting and sensitivity of a depth image is deteriorated.

Hence, according to the present invention, a resolution of the light-receiving unit 100 is switched from a first resolution to a second resolution, which is lower than the first resolution, in a 3D image mode to eliminate the cross-talk phenomenon.

As an example, if the resolution of the light-receiving unit 1100 is lowered about 25% from highest resolution, time interval between an RGB frame and an IR frame increases.

Hence, since the time of turning on the IR lighting is increased as much as the increased time interval, the IR frame is able to sufficiently recognize the IR lighting, thereby improving sensitivity of a depth image.

The control unit 1400 can control a light-emitting unit 1500 and a timer 1700.

For instance, the light-emitting unit 1500 corresponds to a device generating infrared light and can be operated according to a control signal of the control unit 1400.

In particular, the light-emitting unit 1500 does not output infrared light during a first time and may be able to output infrared light during a second time according to a control signal of the control unit 1400.

In this case, operating time of the light-emitting unit 1500 may correspond to time between an end time of a previous frame and a start time of a next frame of color image information.

The timer 1700 can measure a first time for turning off an operation of the light-emitting unit 1500 and a second time for turning on the operation of the light-emitting unit 1500.

Hence, the control unit 1400 can control operation of the light-emitting unit 1500 according to the time measured by the timer 1700.

The storing unit 1600 can store color image information and depth image information extracted by the image processing unit 1200.

In this case, since time of obtaining the color image information obtained by the image processing unit 1200 and time of obtaining the depth image information obtained by the image processing unit 1200 are different from each other, the storing unit 1600 may play a role of a buffer in which the extracted image informations are staying for prescribed time for a next processing step.

Hence, according to the present invention, since it is able to process both color image information and depth image information at the same time using the light-receiving unit including the first sensing unit configured to sense a visible light and the second sensing unit configured to sense an infrared light, configuration is simple and 3D image processing time and overall cost can be reduced.

According to the present invention, if exposure time of an infrared light between an end time of a previous frame and a start time of a next frame of color image information is increased in a manner of switching a resolution of the light-receiving unit from a first resolution to a second resolution, which is lower than the first resolution, sensitivity and contrast of a depth image is enhanced, thereby improving depth of a 3D image.

Moreover, according to the present invention, in case of obtaining depth image information, since the depth image information can be extracted from not only infrared light received by the second sensing unit of the light-receiving unit but also infrared light received by the first sensing unit of the light-receiving unit, sensitivity and contrast of a depth image is enhanced, thereby improving depth of a 3D image.

Figure 4A:
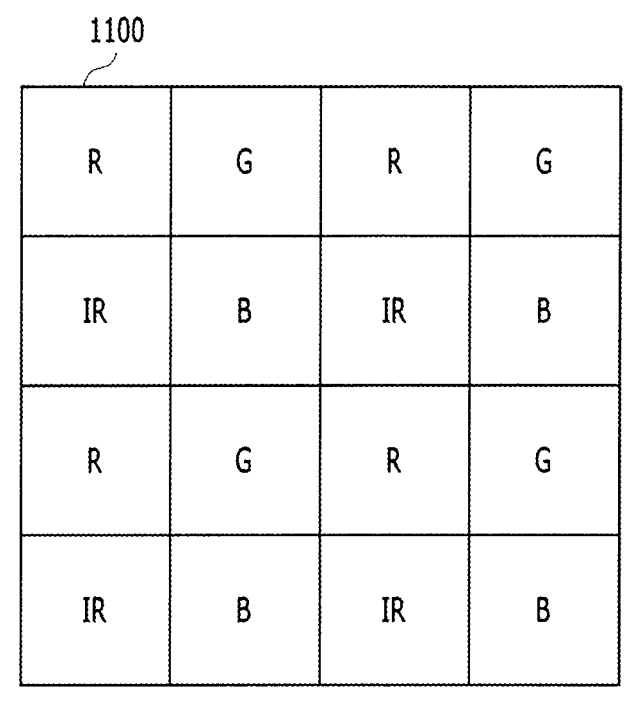
Figure 4B:
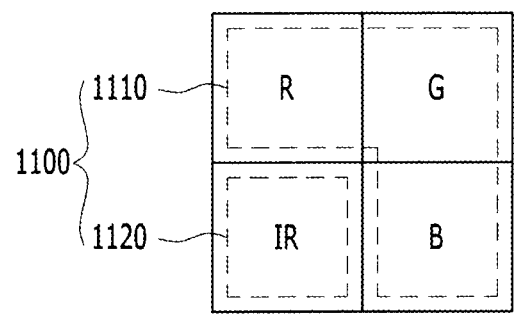

FIGS. 4a-4b are a diagram for a bayer pattern according to a light-receiving unit shown in FIG. 3. FIG. 4a is a diagram for pixel arrangement of the light-receiving unit and FIG. 4b is a diagram for a unit pixel of the light-receiving unit.

As shown in FIGS. 4a-4b, a light-receiving unit 1100 can include pixels capable of sensing a visible light of a red color, a green color and a blue color wavelength range and pixels capable of sensing an infrared light.

For instance, a plurality of unit pixels, which include a first sensing unit 1110 sensing a visible light of a red color, a green color and a blue color wavelength range and a second sensing unit 1120 sensing an infrared light, can be arranged in the light-receiving unit 1100.

In this case, the first sensing unit 1110 can include a first pixel sensing a light of a red color wavelength range, a second pixel sensing a light of a green color wavelength range and a third pixel sensing a light of a blue color wavelength range.

In some cases, the first sensing unit 1110 may include a first pixel sensing a light of a yellow color wavelength range, a second pixel sensing a light of a cyan color wavelength range and a third pixel sensing a light of a magenta color wavelength range.

As a further different case, the first sensing unit 1110 can include a first pixel sensing a light of a red color wavelength range, a second pixel sensing a light of a green color wavelength range, a third pixel sensing a light of a blue color wavelength range and a fourth pixel sensing a light of one of white color, yellow color, cyan color and magenta color wavelength range.

Figure 5A:
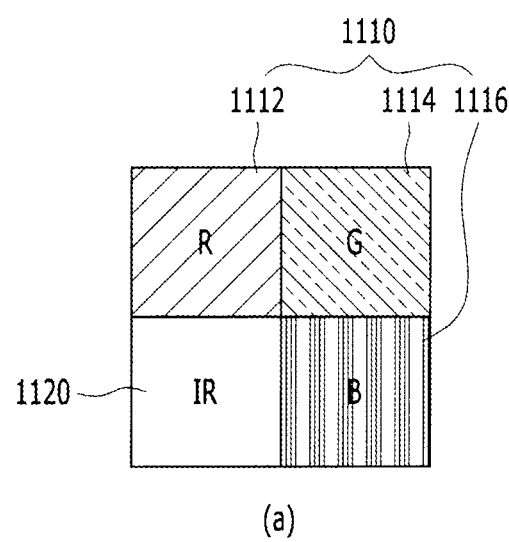
FIGS. 5a-5b are a diagram of a first embodiment for a unit pixel of a light-receiving unit.
Figure 5B:
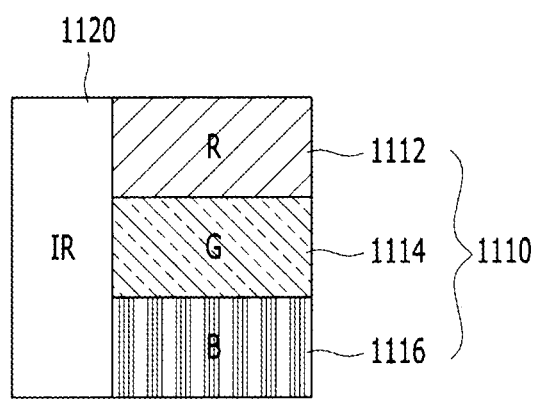

FIGS. 5a-5b are a diagram of a first embodiment for a unit pixel of a light-receiving unit. FIG. 5a is a diagram for an arrangement structure that pixels of a first sensing unit are surrounding a second sensing unit and FIG. 5b is a diagram for an arrangement structure that the pixels of the first sensing unit are arranged side by side at one side of the second sensing unit.

As shown in FIGS. 5a-5b, a light-receiving unit can include a unit pixel consisting of a first sensing unit 1110 sensing a visible light of a red color, a green color and a blue color wavelength range and a second sensing unit 1120 sensing an infrared light.

In this case, the first sensing unit 1110 can include a first pixel 1112 sensing a light of a red color wavelength range, a second pixel 1114 sensing a light of a green color wavelength range and a third pixel 1116 sensing a light of a blue color wavelength range.

In this case, areas of the first, the second and the third pixel 1112/1114/1116 may be identical to each other.

And, the areas of the first, the second and the third pixel 1112/1114/1116 may be identical to that of the second sensing unit 1120 sensing an infrared light.

Figure 6:
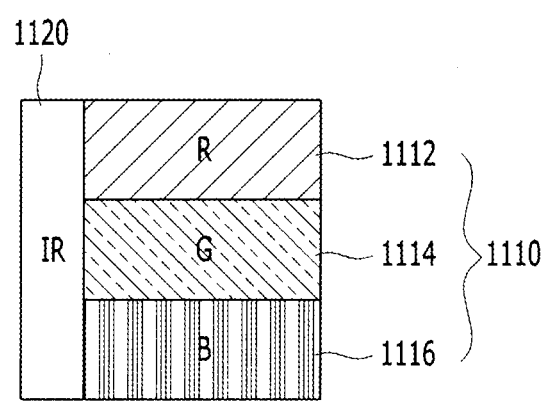
FIG. 6 is a diagram of a second embodiment for a unit pixel of a light-receiving unit.

FIG. 6 is a diagram of a second embodiment for a unit pixel of a light-receiving unit.

As shown in FIG. 6, a light-receiving unit can include a unit pixel consisting of a first sensing unit 1110 sensing a visible light of a red color, a green color and a blue color wavelength range and a second sensing unit 1120 sensing an infrared light. The first sensing unit 1110 can include a first pixel 1112 sensing a light of a red color wavelength range, a second pixel 1114 sensing a light of a green color wavelength range and a third pixel 1116 sensing a light of a blue color wavelength range.

In this case, areas of the first, the second and the third pixel 1112/1114/1116 may be identical to each other. Yet, an area of one pixel among the first, the second and the third pixel 1112/1114/1116 may be greater than an area of the second sensing unit 1120 sensing an infrared light.

As mentioned in the foregoing description, although the area of the second sensing unit 1120, which has influence on sensitivity and contrast of a depth image, is relatively smaller than the area of the first sensing unit 1110, if a method of processing a depth image according to the present invention is used, sensitivity and contrast for both a depth image and a color image can be enhanced at the same time. Regarding this, it shall be described later in more detail.

Figure 7A:
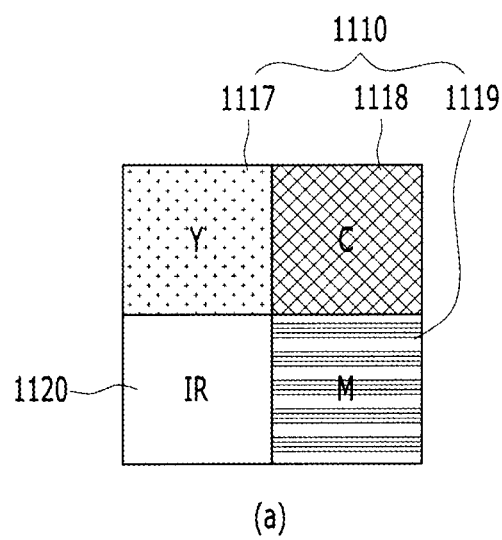
FIGS. 7a-7b are a diagram of a third embodiment for a unit pixel of a light-receiving unit.
Figure 7B:
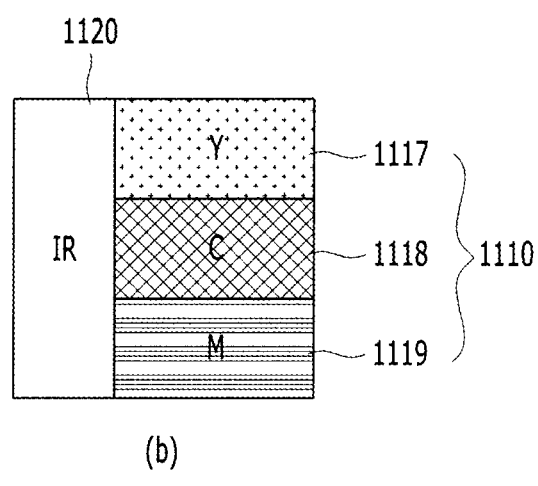

FIGS. 7a-7b are a diagram of a third embodiment for a unit pixel of a light-receiving unit. FIG. 7a is a diagram for an arrangement structure that pixels of a first sensing unit are surrounding a second sensing unit and FIG. 7b is a diagram for an arrangement structure that pixels of a first sensing unit are arranged side by side at one side of a second sensing unit.

As shown in FIGS. 7a-7b, a light-receiving unit can include a first sensing unit 1110 sensing a visible light of a yellow color, a cyan color and a magenta color wavelength range and a second sensing unit 1120 sensing an infrared light.

In this case, the first sensing unit 1110 can include a fourth pixel 1117 sensing a light of a yellow color wavelength range, a fifth pixel 1118 sensing a light of a cyan color wavelength range and a sixth pixel 1119 sensing a light of a magenta color wavelength range.

In this case, areas of the fourth, the fifth and the sixth pixel 1117/1118/1119 may be identical to each other.

And, the areas of the fourth, the fifth and the sixth pixel 1117/1118/1119 may be identical to that of the second sensing unit 1120 sensing an infrared light.

Figure 8:
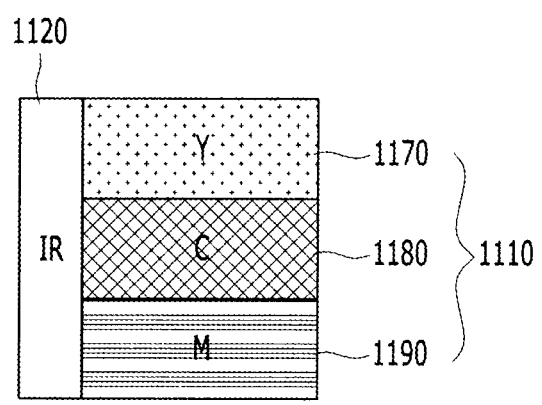
FIG. 8 is a diagram of a fourth embodiment for a unit pixel of a light-receiving unit.

FIG. 8 is a diagram of a fourth embodiment for a unit pixel of a light-receiving unit.

As shown in FIG. 8, a light-receiving unit can include a unit pixel consisting of a first sensing unit 1110 sensing a visible light of a yellow color, a cyan color and a magenta color wavelength range and a second sensing unit 1120 sensing an infrared light. The first sensing unit 1110 can include a fourth pixel 1117 sensing a light of a yellow color wavelength range, a fifth pixel 1118 sensing a light of a cyan color wavelength range and a sixth pixel 1119 sensing a light of a magenta color wavelength range.

In this case, areas of the fourth, the fifth and the sixth pixel 1117/1118/1119 may be identical to each other. Yet, an area of one pixel among the fourth, the fifth and the sixth pixel 1117/1118/1119 may be greater than an area of the second sensing unit 1120 sensing an infrared light.

As mentioned in the foregoing description, although the area of the second sensing unit 1120, which has influence on sensitivity and contrast of a depth image, is relatively smaller than the area of the first sensing unit 1110, if a method of processing a depth image according to the present invention is used, sensitivity and contrast for both a depth image and a color image can be enhanced at the same time.

Figure 9A:
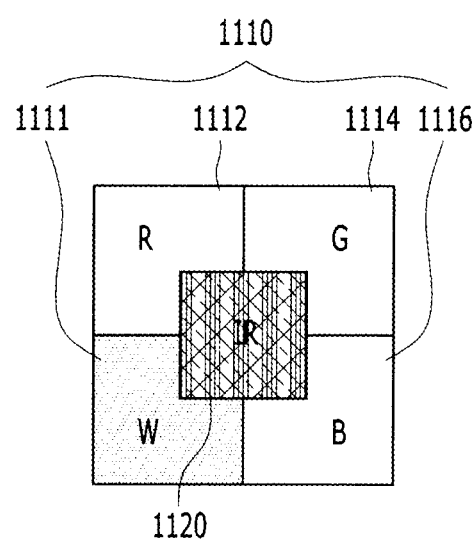
FIGS. 9a-9b are a diagram of a fifth embodiment for a unit pixel of a light-receiving unit.
Figure 9B:
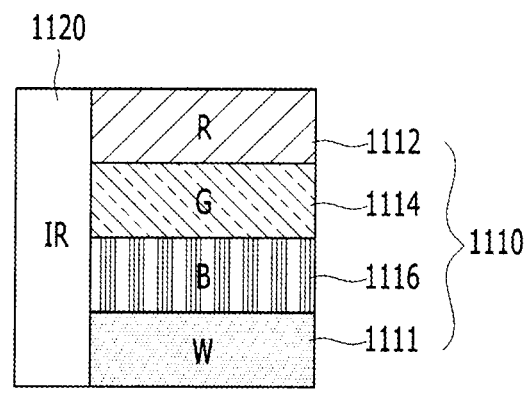

FIGS. 9a-9b are a diagram of a fifth embodiment for a unit pixel of a light-receiving unit. FIG. 9a is a diagram for an arrangement structure that pixels of a first sensing unit are surrounding a second sensing unit and FIG. 9b is a diagram for an arrangement structure that pixels of a first sensing unit are arranged side by side at one side of a second sensing unit.

As shown in FIGS. 9a-9b, a light-receiving unit can include a unit pixel consisting of a first sensing unit 1110 sensing a visible light of a red color, a green color and a blue color wavelength range and a visible light of one of a yellow color, a cyan color and a magenta color wavelength range and a second sensing unit 1120 sensing an infrared light.

In this case, the first sensing unit 1110 can include a first pixel 1112 sensing a light of a red color wavelength range, a second pixel 1114 sensing a light of a green color wavelength range, a third pixel 1116 sensing a light of a blue color wavelength range and a seventh pixel 1111 sensing a light of one of a white color, a yellow color, a cyan color and a magenta color wavelength range.

In this case, areas of the first, the second, the third and the seventh pixel 1112/1114/1116/1111 may be identical to each other.

And, the areas of the first, the second, the third and the seventh pixel 1112/1114/1116/1111 may also be identical to that of the second sensing unit 1120 sensing an infrared light.

Figure 10:
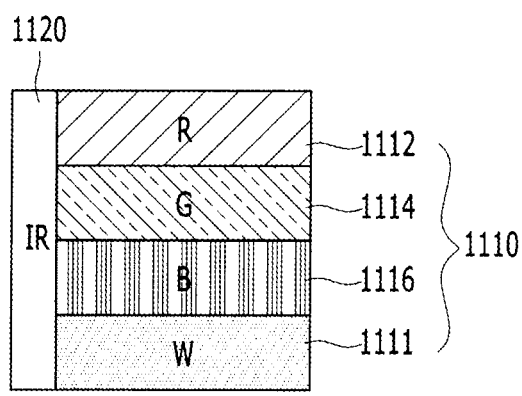
FIG. 10 is a diagram of a sixth embodiment for a unit pixel of a light-receiving unit.

FIG. 10 is a diagram of a sixth embodiment for a unit pixel of a light-receiving unit.

As shown in FIG. 10, a light-receiving unit can include a unit pixel consisting of a first sensing unit 1110 sensing a visible light of a red color, a green color and a blue color wavelength range and a visible light of one of a yellow color, a cyan color and a magenta color wavelength range and a second sensing unit 1120 sensing an infrared light. In this case, the first sensing unit 1110 can include a first pixel 1112 sensing a light of a red color wavelength range, a second pixel 1114 sensing a light of a green color wavelength range, a third pixel 1116 sensing a light of a blue color wavelength range and a seventh pixel 1111 sensing a light of one of a white color, a yellow color, a cyan color and a magenta color wavelength range.

In this case, areas of the first, the second, the third and the seventh pixel 1112/1114/1116/1111 may be identical to each other. Yet, an area of one pixel among the first, the second, the third and the seventh pixel 1112/1114/1116/1111 may be greater than an area of the second sensing unit 1120 sensing an infrared light.

As mentioned in the foregoing description, although the area of the second sensing unit 1120, which has influence on sensitivity and contrast of a depth image, is relatively smaller than the area of the first sensing unit 1110, if a method of processing a depth image according to the present invention is used, sensitivity and contrast for both a depth image and a color image can be enhanced at the same time.

Figure 11:
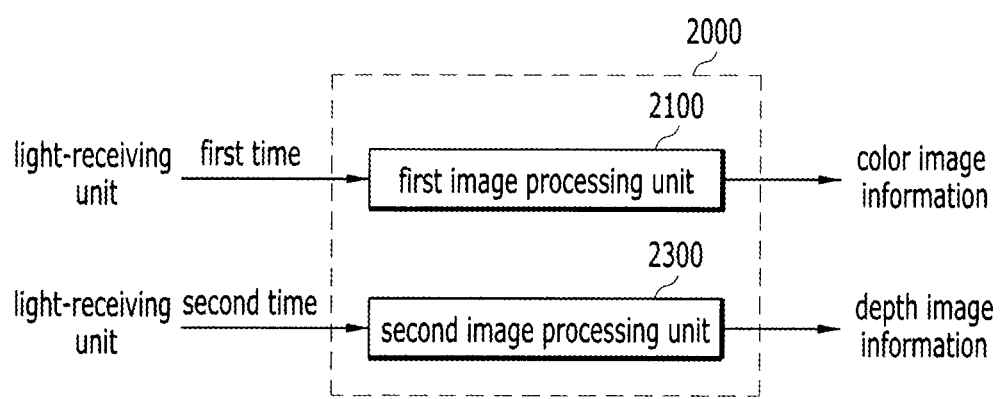
FIG. 11 is a block diagram for an image processing unit of FIG. 3.

FIG. 11 is a block diagram for an image processing unit of FIG. 3.

As shown in FIG. 11, an image processing unit 2000 can include a first image processing unit 2100 and a second image processing unit 2300.

In this case, the first image processing unit 2100 extracts color image information from a visible light sensed by a first sensing unit of a light-receiving unit during a first time and can store the extracted color image information in a storing unit 1600 shown in FIG. 3.

The second image processing unit 2300 extracts second depth image information from an infrared light sensed by a second sensing unit of the light-receiving unit during a second time and can store the extracted second depth image information in the storing unit 1600 shown in FIG. 3.

In some cases, the second image processing unit 2300 extracts first depth image information from an infrared light sensed by the first sensing unit of the light-receiving unit during the second time, eliminates noise from the first depth image information and can store the noise-free first depth image information in the storing unit 1600 shown in FIG. 3.

Subsequently, the second image processing unit 2300 extracts the second depth image information from the infrared light sensed by the second sensing unit of the light-receiving unit during the second time and can store the extracted second depth image information in the storing unit 1600 shown in FIG. 3.

Subsequently, the second image processing unit 2300 can compose the noise-free first depth image information and the second depth image information with each other.

Figure 12:
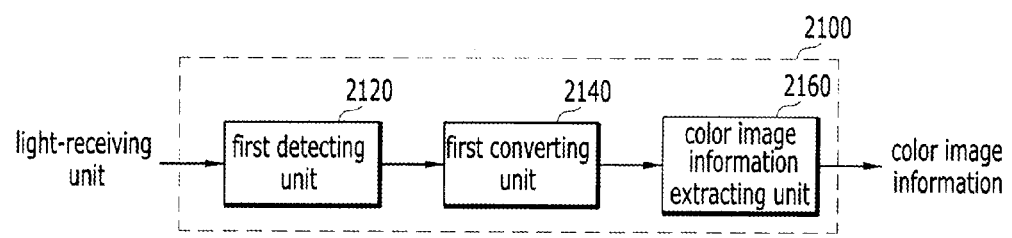
FIG. 12 is a block diagram for a first image processing unit of FIG. 11.

FIG. 12 is a block diagram for a first image processing unit of FIG. 11.

As shown in FIG. 12, a first image processing unit 2100 can include a first image processing unit 2100, a first detecting unit 2120, a first converting unit 2140 and a color image information extracting unit 2160.

In this case, the first detecting unit 2120 can detect amount of light of a visible light sensed by a first sensing unit of a light-receiving unit during a first time.

For instance, the first detecting unit 2120 detects amount of light of a red light from a first pixel of the first sensing unit, detects amount of light of a green light from a second pixel of the first sensing unit, detects amount of light of a blue light from a third pixel of the first sensing unit and can detect amount of light of an infrared light from a second sensing unit in a unit pixel of the light-receiving unit.

In some cases, the first detecting unit 2120 can detect amount of light of a white light, that of a yellow light, that of a cyan light and that of a magenta light except the amount of light of the red light, the amount of light of the green light and the amount of light of the blue light according to a type of the light-receiving unit.

Subsequently, the first converting unit 2140 can convert amount of light of a detected visible light into an electrical signal.

Subsequently, the color image information extracting unit 2160 can extract color image information from a visible light, which is converted into an electrical signal.

In this case, the color image information extracting unit 2160 performs a binning process for extracted color image information.

In this case, the binning process indicates that a new pixel is obtained by combining a plurality of pixels of the light-receiving unit 1100 with each other. Since two or more pixels are combined with each other, sensitivity and SNR (signal to noise ratio) become better compared to a case of obtaining the sensitivity and SNR by one pixel. Hence, a clear color image can be obtained in dark lighting.

By doing so, the first image processing unit 2100 can obtain color image information from the visible light sensed by the first sensing unit of the light-receiving unit during the first time.

Figure 13:
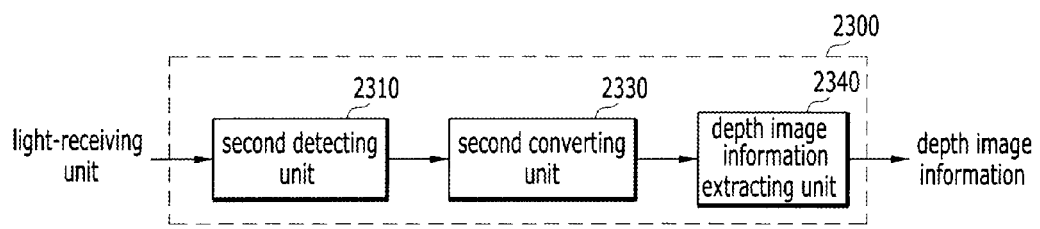
FIG. 13 is a block diagram for a second image processing unit of FIG. 11.

FIG. 13 is a block diagram for a second image processing unit of FIG. 11.

As shown in FIG. 13, a second image processing unit 2300 can include a second detecting unit 2310, a second converting unit 2330 and a depth image information extracting unit 2340.

In this case, the second detecting unit 2310 can detect amount of light of an infrared light sensed by a second sensing unit of a light-receiving unit during a second time.

For instance, the second detecting unit 2310 can detect the amount of light of the infrared light from the second sensing unit in a unit pixel of the light-receiving unit.

Subsequently, the second converting unit 2330 can convert the amount of light of the detected infrared light into an electrical signal.

Subsequently, the depth image information extracting unit 2340 can extract depth image information from the infrared light, which is sensed by the second sensing unit of the light-receiving unit.

In this case, the depth image information extracting unit 2340 performs a sub sampling process of infrared (IR) pixel for the extracted depth image information.

In this case, the sub sampling process indicates a process of collecting depth information of IR pixels only from an IR frame. Since the depth information of the IR pixels are collected and outputted only, sensitivity and contrast for a depth image can be enhanced.

By doing so, the second image processing unit 2300 can obtain depth image information from the infrared light sensed by the second sensing unit of the light-receiving unit during the second time.

Figure 14:
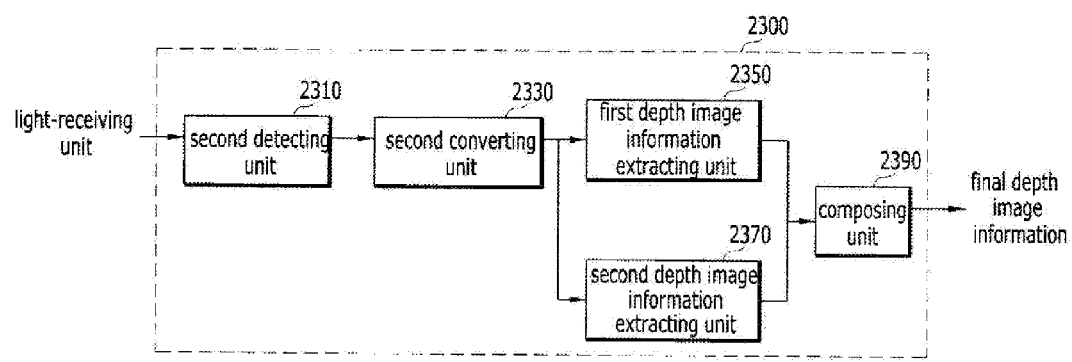
FIG. 14 is a block diagram for a different embodiment of a second image processing unit of FIG. 11.

FIG. 14 is a block diagram for a different embodiment of a second image processing unit of FIG. 11.

As shown in FIG. 14, a second image processing unit 2300 can include a second detecting unit 2310, a second converting unit 2330, a first and a second depth image information extracting unit 2350/2370 and a composing unit 2390.

In this case, the second detecting unit 2310 can detect amount of light of an infrared light sensed by a first sensing unit and a second sensing unit of a light-receiving unit during a second time.

For instance, the second detecting unit 2310 detects amount of light of a red light and amount of light of the infrared light from a first pixel of the first sensing unit, detects amount of light of a green light and amount of light of the infrared light from a second pixel of the first sensing unit, detects amount of light of a blue light and amount of light of the infrared light from a third pixel of the first sensing unit and can detect amount of light of the infrared light from the second sensing unit in a unit pixel of the light-receiving unit.

Subsequently, the second converting unit 2330 can convert the amount of light of the detected infrared light into an electrical signal.

Subsequently, the first depth image information extracting unit 2350 extracts first depth image information from the infrared light, which is sensed by the first sensing unit of the light-receiving unit, eliminates noise from the extracted first depth image information and can store the noise-free first depth image information in a storing unit 1600 shown in FIG. 1.

And, the second depth image information extracting unit 2370 extracts second depth image information from the infrared light, which is sensed by the second sensing unit of the light-receiving unit, and can store the extracted second depth image information in the storing unit 1600 shown in FIG. 3.

Subsequently, the composing unit 2390 composes the first depth image information extracted by the first depth image information extracting unit 2350 and the second depth image information extracted by the second depth image information extracting unit 2370 with each other and can generate final depth image information.

The second image processing unit 2300 can extract depth image information using Formula 1 in the following.

if $(\alpha(R_2-R_1)>R_{th}), IR_2=IR_2+\alpha(R_2-R_1)$ if $(\beta(G_2-G_1)>G_{th}), IR_2=IR_2+\beta(G_2-G_1)$ if $(\gamma(B_2-B_1)>B_{th}), IR_2=IR_2+\gamma(B_2-B_1)$ [Formula 1]

In this case, $IR_2$ corresponds to second depth image information, $R_1$, $G_1$ and $B_1$ correspond to a first noise value for the infrared light of the first sensing unit extracted during the first time, $R_2$, $G_2$ and $B_2$ correspond to a second noise value for the infrared light of the first sensing unit extracted during the second time, $\alpha$, $\beta$ and $\gamma$ correspond to a weighted value to which sensitivity characteristic of the first sensing unit is reflected and $R_{th}$, $G_{th}$ and $B_{th}$ correspond to physical noise threshold of the first sensing unit.

$\alpha(R_2-R_1)$ corresponds to first depth image information from which noise is eliminated in a manner of being extracted from a first pixel of the first sensing unit sensing a red light and an infrared light in a unit pixel of a light-receiving unit. $\beta(G_2-G_1)$ corresponds to first depth image information from which noise is eliminated in a manner of being extracted from a second pixel of the first sensing unit sensing a green light and an infrared light in a unit pixel of a light-receiving unit. $\gamma(B_2-B_1)$ corresponds to first depth image information from which noise is eliminated in a manner of being extracted from a third pixel of the first sensing unit sensing a blue light and an infrared light in a unit pixel of a light-receiving unit.

Figure 15:
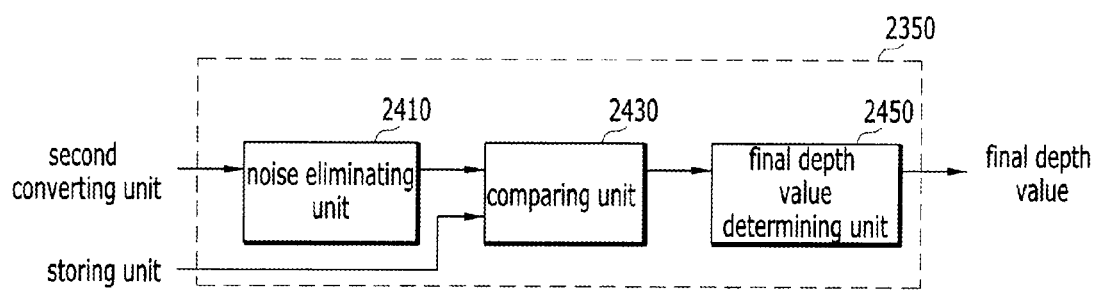
FIG. 15 is a block diagram for a first depth image information extracting unit of FIG. 14.

FIG. 15 is a block diagram for a first depth image information extracting unit of FIG. 14.

As shown in FIG. 15, a first depth image information extracting unit 2370 can include a noise eliminating unit 2410, a comparing unit 2430 and a final depth value determining unit 2450.

In this case, the noise eliminating unit 2410 can calculate a depth value from which noise is eliminated by eliminating noise from an infrared light which is sensed by a first sensing unit of a light-receiving unit.

For instance, the noise eliminating unit 2410 can extract a first noise value from the infrared light sensed by the first sensing unit during a first time and can extract a second noise value from the infrared light sensed by the first sensing unit during a second time.

In this case, the first noise value may correspond to a visible light sensed by the first sensing unit during the first time except the infrared light.

The second noise value may correspond to a visible light sensed by the first sensing unit during the second time except the infrared light.

Subsequently, the noise eliminating unit 2410 calculates a difference value resulted from subtracting the first noise value from the second noise value and can calculate a noise-free depth value in a manner of multiplying a weighted value by the difference value.

In this case, the difference value between the second noise value and the first noise value may correspond to a depth value of a pure infrared light from which noise is eliminated.

And, the weighted value may correspond to a value to which a sensitivity characteristic of each pixel of the first sensing unit is reflected.

Subsequently, the comparing unit 2430 can compare the noise-free depth value with a physical noise value of the first sensing unit to identify whether the noise-free depth value is greater than the physical noise value of the first sensing unit.

Subsequently, as a result of the comparison, if it is determined that the noise-free depth value is greater than the physical noise value of the first sensing unit, the final depth value determining unit 2450 can determine the noise-free depth value as a final depth value of the first depth image information.

In this case, if the noise-free depth value is greater than the physical noise value of the first sensing unit, it may impact on enhancing sensitivity and contrast of a depth image. Yet, if the noise-free depth value is equal to or less than the physical noise value of the first sensing unit, it does not impact on enhancing sensitivity and contrast of the depth image. Hence, the noise-free depth value can be ignored.

A method of processing a 3D image of a digital device according to the present invention is described in the following.

Figure 16:
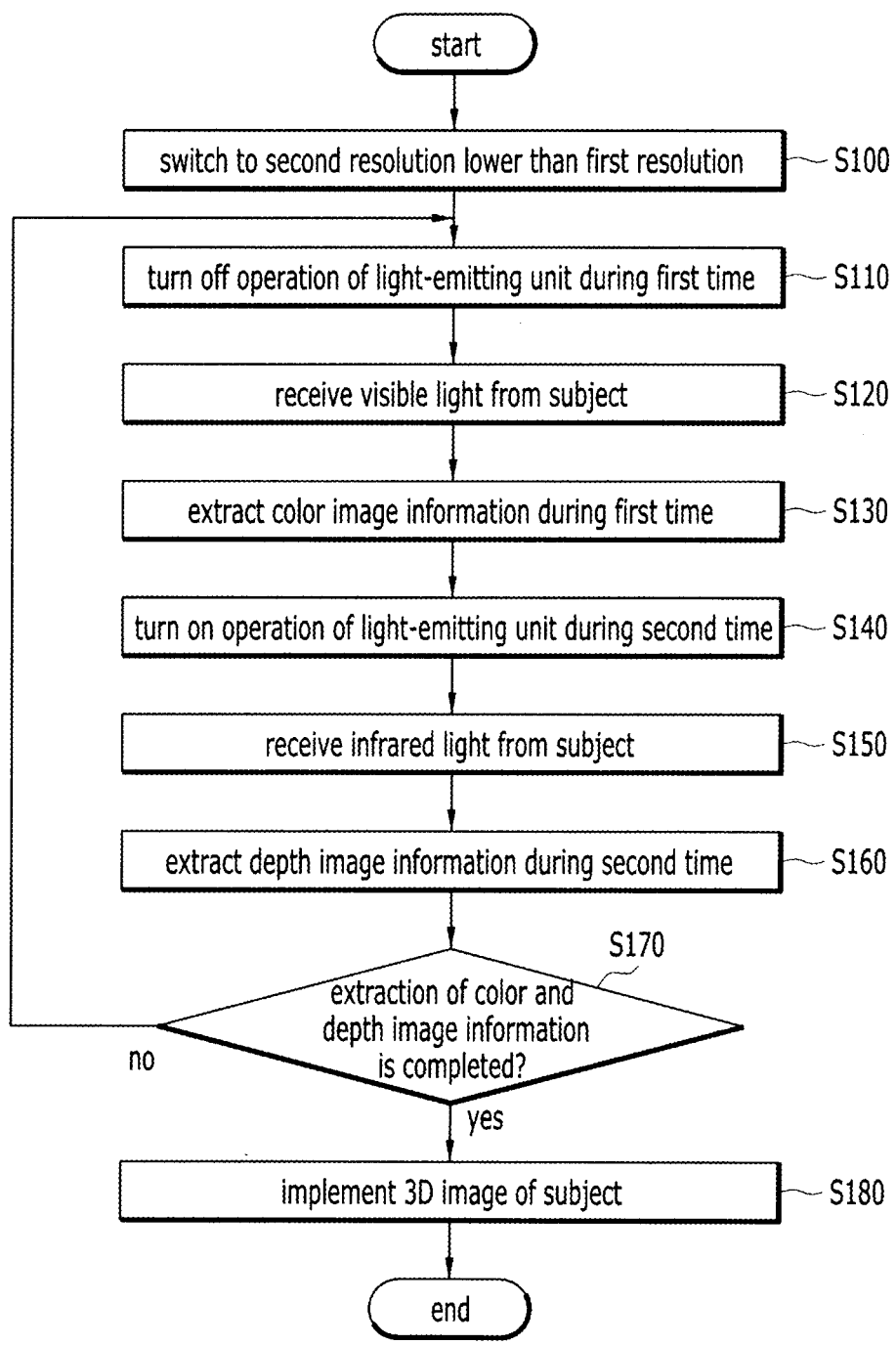
FIG. 16 and FIG. 17 are flowcharts for a method of processing a three dimensional image of a digital device according to the present invention.
Figure 17:
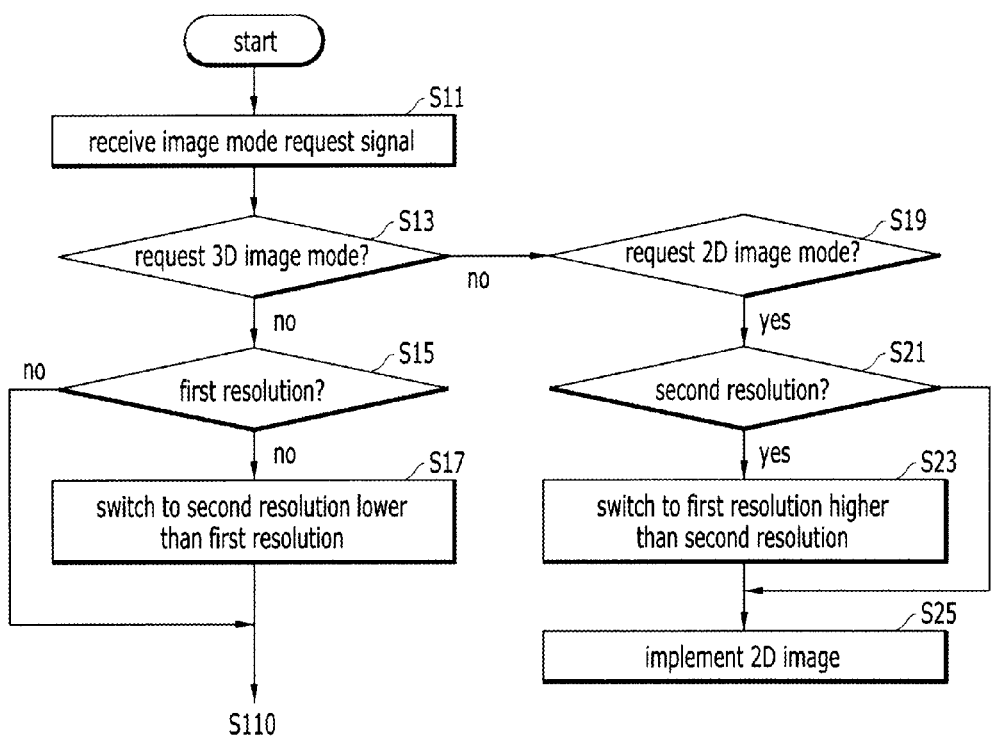

FIG. 16 and FIG. 17 are flowcharts for a method of processing a three dimensional image of a digital device according to the present invention. FIG. 16 and FIG. 17 are explained with reference to a 3D image processing device shown in FIG. 3.

As shown in FIG. 16 and FIG. 17, first of all, if an image mode request signal is received from external [S11], a control unit 1400 checks whether the image mode request signal corresponds to a 3D image mode request signal [S13].

Subsequently, if the image mode request signal corresponds to the 3D image mode request signal, the control unit 1400 checks whether a resolution mode of a light-receiving unit 1100 corresponds to a first resolution [S15].

Subsequently, if the resolution mode of the light-receiving unit 1100 corresponds to the first resolution, the control unit 1400 can switch the resolution of the light-receiving unit 110 from the first resolution to a second resolution, which is lower than the first resolution [S17].

Yet, if the image mode request signal corresponds to a 2D image mode request signal [S19], the control unit 1400 checks whether the resolution mode of the light-receiving unit 1100 corresponds to the second resolution [S21].

If the resolution mode of the light-receiving unit 1100 corresponds to the second resolution, the control unit 1400 switches the resolution of the light-receiving unit 110 from the second resolution to the first resolution, which is higher than the second resolution [S23] and can implement a 2D image [S25].

As mentioned earlier, the control unit 1400 can switch the resolution of the light-receiving unit 1100 from the first resolution to the second resolution, which is lower than the first resolution [S100].

The resolution of the light-receiving unit 1100 is switched to reduce a cross-talk.

In this case, the cross-talk corresponds to interference between an RGB frame in which color image information is obtained and an IR frame in which depth image information is obtained.

In particular, the IR frame needs IR lighting and the RGB frame does not need the IR lighting. When the IR lighting of the IR frame affects the RGB frame, noise or distortion occurs in an RGB image. This phenomenon is called the cross-talk.

Hence, in order not to give a cross-talk impact to RGB frames situating at before and after an IR frame, the IR lighting should be momentarily turned on.

Yet, if time of turning on the IR lighting is too short, the IR frame cannot recognize the IR lighting and sensitivity of a depth image is deteriorated.

Hence, according to the present invention, a resolution of the light-receiving unit 100 is switched from a first resolution to a second resolution, which is lower than the first resolution, in a 3D image mode to eliminate the cross-talk phenomenon.

As an example, if the resolution of the light-receiving unit 1100 is lowered about 25% from highest resolution, time interval between an RGB frame and an IR frame increases.

Hence, since the time of turning on the IR lighting is increased as much as the increased time interval, the IR frame is able to sufficiently recognize the IR lighting, thereby improving sensitivity of a depth image.

Subsequently, the control unit 1440 can turn off operation of a light-emitting unit 1500 during a first time in order not to output an infrared light with reference time measurement of a timer 1700 [S110].

Subsequently, the light-receiving unit 1100 can receive a visible light from a subject 1800 [S120].

Subsequently, the control unit 1400 can extract color image information from the visible light sensed by a first sensing unit 1110 of the light-receiving unit 1100 during the first time in a manner of controlling an image processing unit 1200 [S130].

Subsequently, the control unit 140 can turn on operation of the light-emitting unit 1500 during a second time in order to output an infrared light to the subject 1800 with reference to time measurement of the timer 1700 [S140].

In this case, operating time of the light-emitting unit 1500 may correspond to time between an end time of a previous frame and a start time of a next frame of the color image information.

Subsequently, the light-receiving unit 1100 can receive the infrared light from the subject 1800 [S150].

Subsequently, the control unit 1400 can extract depth image information from the infrared light sensed by a second sensing unit 1120 of the light-receiving unit 1100 during a second time in a manner of controlling the image processing unit 1200 [S160].

In some cases, the light-receiving unit 1100 can receive both a visible light and an infrared light from the subject 1800.

Subsequently, the control unit 1400 can extract all depth image information from infrared lights sensed by the first sensing unit 1110 and the second sensing unit 1120 of the light-receiving unit 1100 during the second time in a manner of controlling the image processing unit 1200.

Subsequently, the control unit 1400 can determine whether extraction of both the color image information and the depth image information for the subject 1800 is completed [S170].

Subsequently, if it is determined that the extraction of both the color image information and the depth image information for the subject 1800 is completed, the control unit 1400 can implement a 3D image of the subject 1800 based on the extracted color image information and the depth image information in a manner of controlling a 3D image implementing unit 1300 [S180].

If the extraction of both the color image information and the depth image information for the subject 1800 is not completed, the step S110 to the step S160 can be repeatedly performed.

In some cases, the step S140 to the step S160 can be performed before the step S110 to the step 130 are performed.

In particular, according to the present invention, the depth image information is extracted first in a manner of turning on operation of the light-emitting unit 500 during the second time and then the color image information can be extracted in a manner of turning off the operation of the light-emitting unit 500 during the first time.

FIGS. 18 to 23 are schematic diagrams for explaining a three dimensional image processing process of a digital device according to the present invention.

Figure 18:
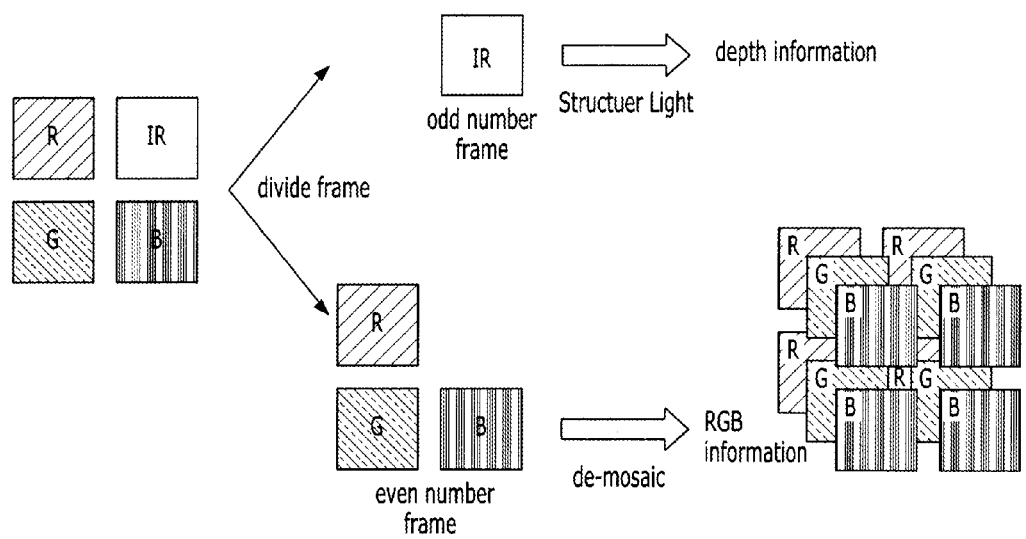
FIGS. 18 to 23 are schematic diagrams for explaining a three dimensional image processing process of a digital device according to the present invention.

As shown in FIG. 18, a 3D image processing device of a digital device extracts color image information during a first time and extracts depth image information during a second time in a 3D image mode.

In particular, the present invention uses a frame by frame technology receiving an RGB frame and an IR frame in turn.

Hence, according to the present invention, color image information and depth image information are not obtained at the same time. Instead, the color image information and the depth image information can be obtained on timings different from each other.

Figure 19:
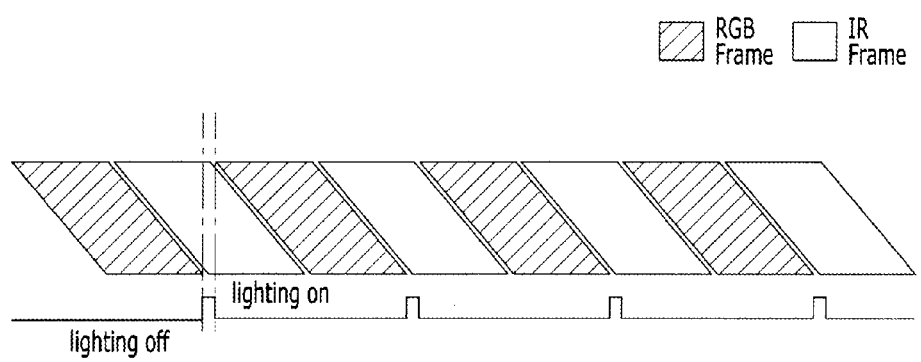
Figure 20:
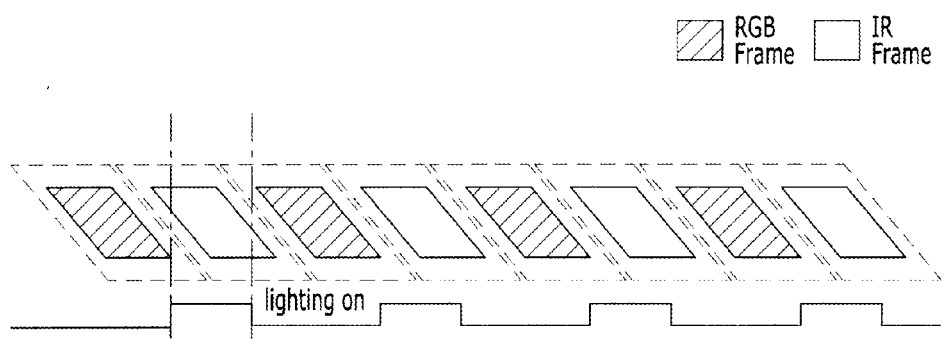

And, as shown in FIG. 19 and FIG. 20, according to the present invention, when a 3D image is implemented, a resolution of a light-receiving unit can be switched to a low resolution mode from a high resolution mode.

The resolution of the light-receiving unit is switched to reduce a cross-talk.

In this case, the cross-talk corresponds to interference between an RGB frame in which color image information is obtained and an IR frame in which depth image information is obtained.

In particular, the IR frame needs IR lighting and the RGB frame does not need the IR lighting. When the IR lighting of the IR frame affects the RGB frame, noise or distortion occurs in an RGB image. This phenomenon is called the cross-talk.

Hence, in order not to give a cross-talk impact to RGB frames situating at before and after an IR frame, the IR lighting should be momentarily turned on.

Yet, as shown in FIG. 19, if time of turning on the IR lighting is too short, the IR frame cannot recognize the IR lighting and sensitivity of a depth image is deteriorated.

Hence, according to the present invention, a resolution of the light-receiving unit is switched from a first resolution to a second resolution, which is lower than the first resolution, in a 3D image mode to eliminate the cross-talk phenomenon.

As an example, if the resolution of the light-receiving unit is lowered about 25% from highest resolution, time interval between an RGB frame and an IR frame increases.

Hence, as shown in FIG. 20, since the time of turning on the IR lighting is increased as much as the increased time interval, the IR frame is able to sufficiently recognize the IR lighting, thereby improving sensitivity of a depth image.

Meanwhile, according to the present invention, color image information and depth image information can be obtained on timings different from each other instead of being obtained on an identical timing.

In particular, according to the present invention, time of obtaining the color image information and time of obtaining the depth image information may be different from each other.

This is because a depth image processing method capable of enhancing sensitivity and contrast for a depth image should be independently performed.

Figure 21:
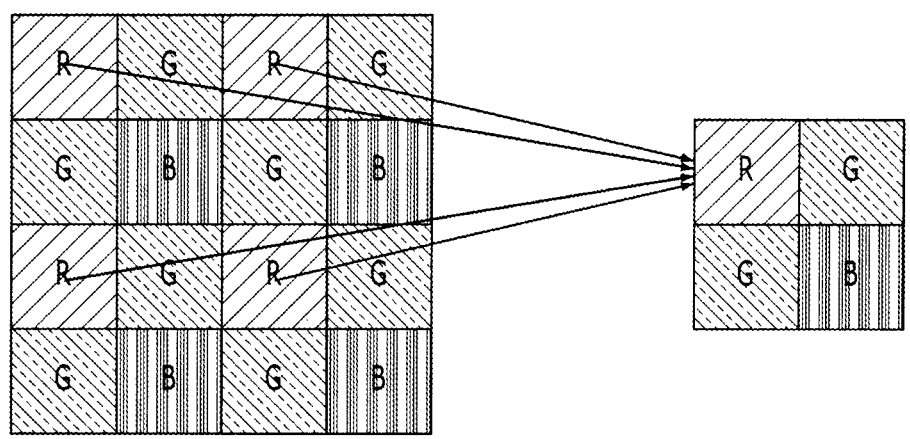

For instance, as shown in FIG. 21, a binning process is performed for obtained color image information according to the present invention.

In this case, the binning process indicates that a new pixel is obtained by combining a plurality of pixels of the light-receiving unit with each other. Since two or more pixels are combined with each other, sensitivity and SNR (signal to noise ratio) become better compared to a case of obtaining the sensitivity and SNR by one pixel. Hence, a clear color image can be obtained in dark lighting.

Figure 22:
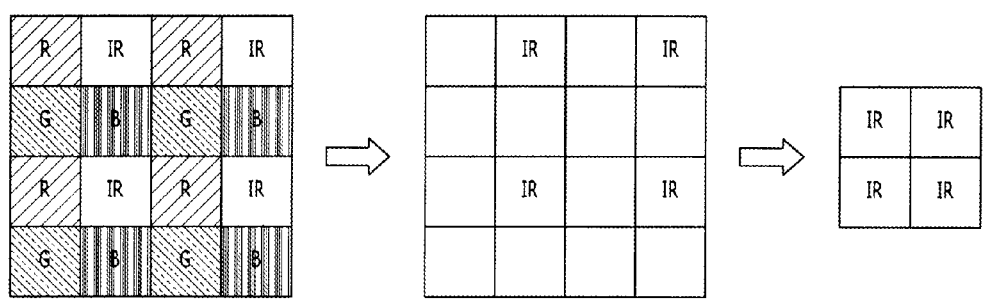

And, as shown in FIG. 22, a sub sampling process of infrared (IR) pixel is performed for obtained color image information according to the present invention.

In this case, the sub sampling process indicates a process of collecting depth information of IR pixels only from an IR frame. Since the depth information of the IR pixels are collected and outputted only, sensitivity and contrast of a depth image can be enhanced.

Figure 23:
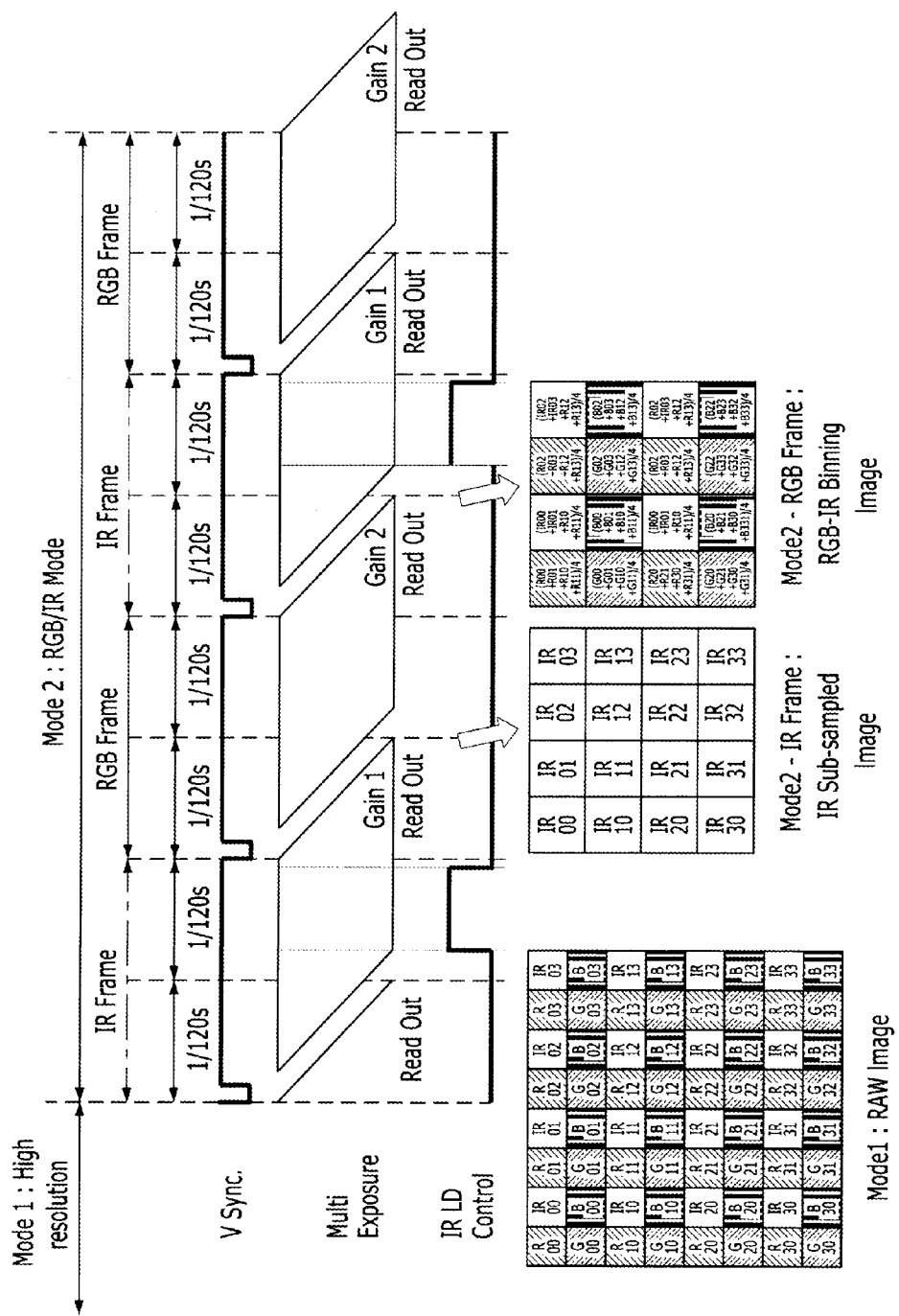

As an example, FIG. 23 is a diagram for IR lighting time in case that an RGB-IR sensor, which is a light-receiving unit, is in a low resolution mode 25% lower than a high resolution mode and operates at about 60 fps.

In this case, an RGB frame may operate at about 30 fps and an IR frame may operate at about 30 fps.

As shown in FIG. 23, according to the present invention, the RGB-IR sensor, which is the light-receiving unit, operates in a high resolution mode in case of implementing a 2D image. And, the RGB-IR sensor, which is the light-receiving unit, operates in a low resolution mode and divides a frame into an RGB frame and an IR frame in case of implementing a 3D image.

And, color image information is extracted by performing a binning process in an RGB frame and depth image information can be extracted by performing a sub sampling process in an IR frame.

In this case, if a resolution of the light-receiving unit is lowered about 25% from highest resolution, time interval between an RGB frame and an IR frame increases. Hence, since time of turning on IR lighting is increased as much as the increased time interval, the IR frame is able to sufficiently recognize the IR lighting, thereby improving sensitivity of a depth image.

In particular, operating time of an IR light-emitting unit may correspond to time between an end time of a previous RGB frame and a start time of a next RGB frame.

Figure 24:
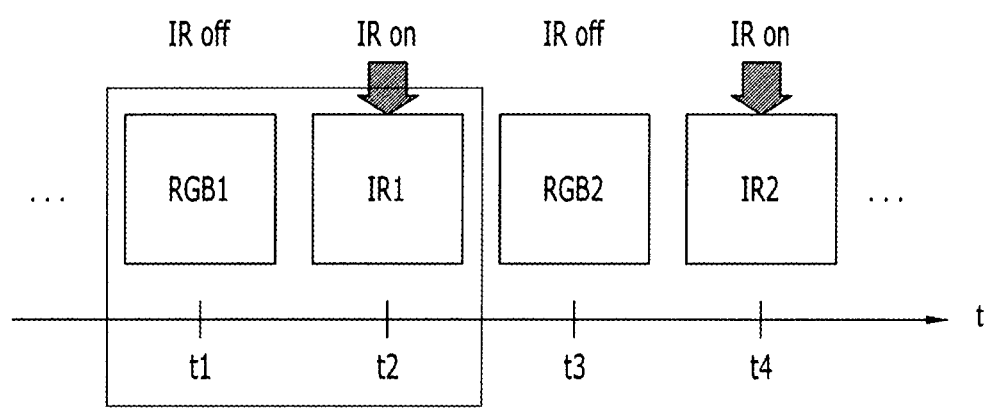
FIG. 24 is a diagram for on/off of a light-emitting unit according to time.

FIG. 24 is a diagram for on/off of a light-emitting unit according to time. As shown in FIG. 24, a light-emitting unit 1500 according to the present invention can repeatedly perform a step of not outputting an infrared light during a first time and a step of outputting an infrared light during a second time in turn according to a control signal of the control unit 1400.

Figure 25:
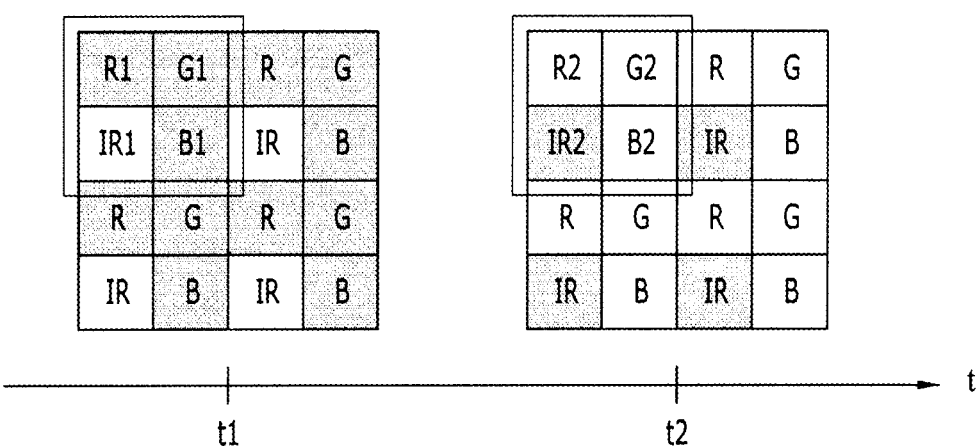
FIG. 25 is a diagram for image information processing of an image processing unit according to time.

FIG. 25 is a diagram for image information processing of an image processing unit according to time. As shown in FIG. 25, an image processing unit 1200 according to the present invention can repeatedly perform a step of extracting color image information during a first time and a step of extracting depth image information during a second time in turn according to a control signal of the control unit 1400.

Figure 26:
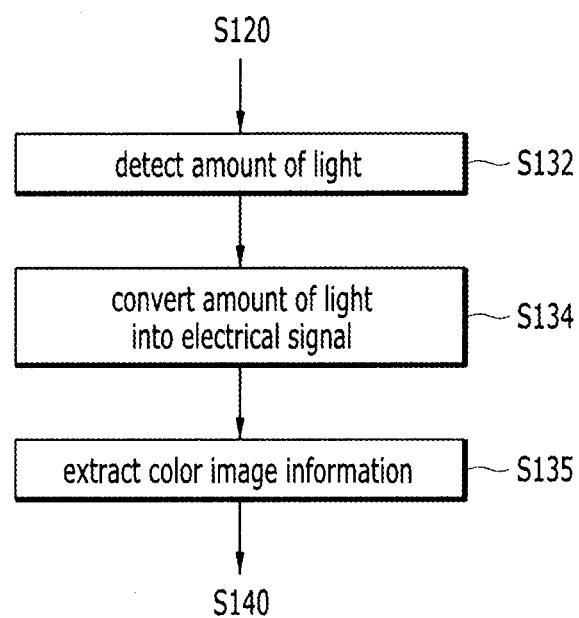
FIG. 26 is a detail flowchart for a method of extracting color image information of FIG. 16.

FIG. 26 is a detail flowchart for a method of extracting color image information of FIG. 16. FIG. 26 is explained with reference to a first image processing unit shown in FIG. 12.

As shown in FIG. 12 and FIG. 26, a first detecting unit 2120 of a first image processing unit 2100 can detect amount of light of a visible light sensed by a first sensing unit 110 shown in FIG. 3 during a first time [S132].

A first converting unit 2140 converts the amount of light of the sensed visible light into an electrical signal [S134] and a color image information extracting unit 2160 can extract color image information from the visible light according to a control signal of a control unit [S135].

In this case, although the first image processing unit 2100 is able to detect an infrared light from the first sensing unit 1100 and a second sensing unit 1200 shown in FIG. 3, since amount of light of the infrared light reflected from a subject is small, it may ignore the amount of light of the infrared light.

In particular, although the infrared light may act as noise on color image information, since a light-emitting unit does not output an infrared light, the amount of light of the infrared light is very small.

Hence, since the extracted noise affecting the color image information is very small, the first image processing unit 2100 may not perform an additional noise elimination work.

Figure 27:
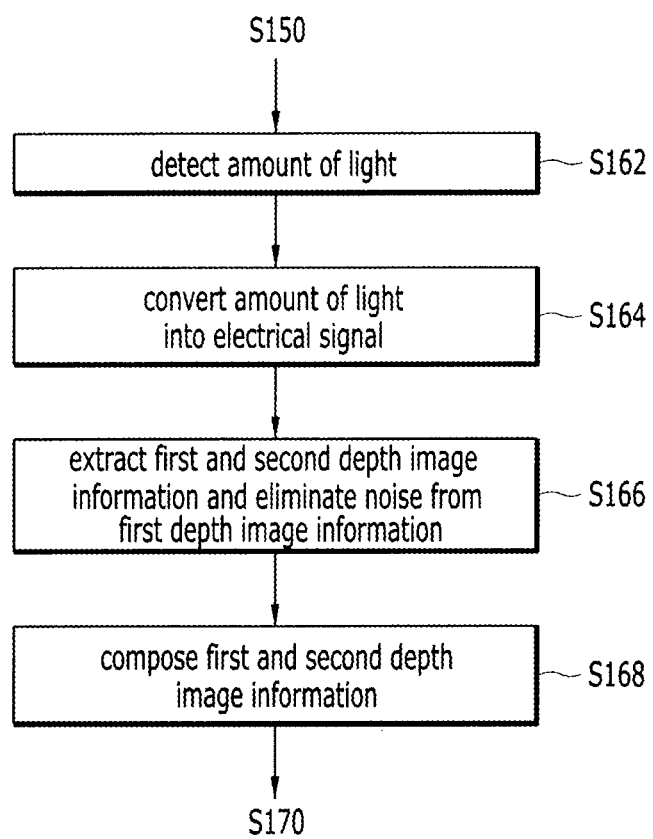
FIG. 27 is a detail flowchart for a method of extracting depth image information of FIG. 16.

FIG. 27 is a detail flowchart for a method of extracting depth image information of FIG. 16. FIG. 27 is explained with reference to a second image processing unit shown in FIG. 14.

As shown in FIG. 14 and FIG. 27, a second detecting unit 2310 of a second image processing unit 2300 can detect amount light of an infrared light sensed by a first sensing unit 1110 and a second sensing unit 1120 shown in FIG. 1 during a first time [S162].

And, a second converting unit 2330 converts the amount of light of the detected infrared light into an electrical signal [S164].

Subsequently, a first depth image information extracting unit 2350 extracts a first depth image information from the infrared light sensed by the first sensing unit and can eliminate noise from the extracted first depth image information [S166].

And, a second depth image information extracting unit 2370 can extract a second depth image information from an infrared light sensed by the second sensing unit [S166].

Subsequently, a composing unit 2390 can compose the noise-free first depth image information and the second depth image information with each other [S168].

As mentioned in the foregoing description, according to the present invention, sensitivity and contrast of depth image information for a subject can be enhanced in a manner of extracting the noise-free first depth image information via the first sensing unit 1110 shown in FIG. 3 and composing the extracted first depth image information with the second depth image information.

If a 3D image of a subject is implemented using the second depth image information only sensed by the second sensing unit 1120 shown in FIG. 3 without composing the first depth image information, depth image information on the subject may be deteriorated.

Figure 28:
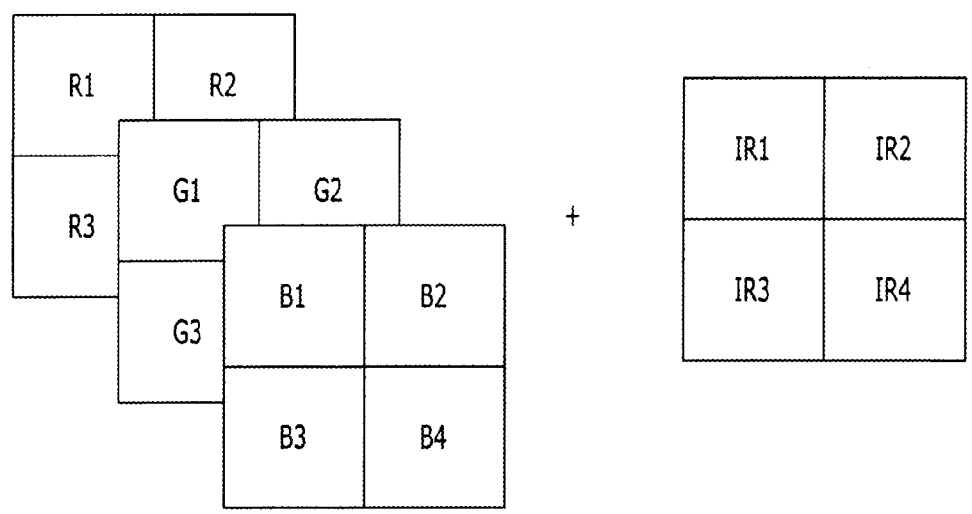
FIG. 28 is a diagram for a bayer pattern in which a first and a second depth image information are not composed.
Figure 29:
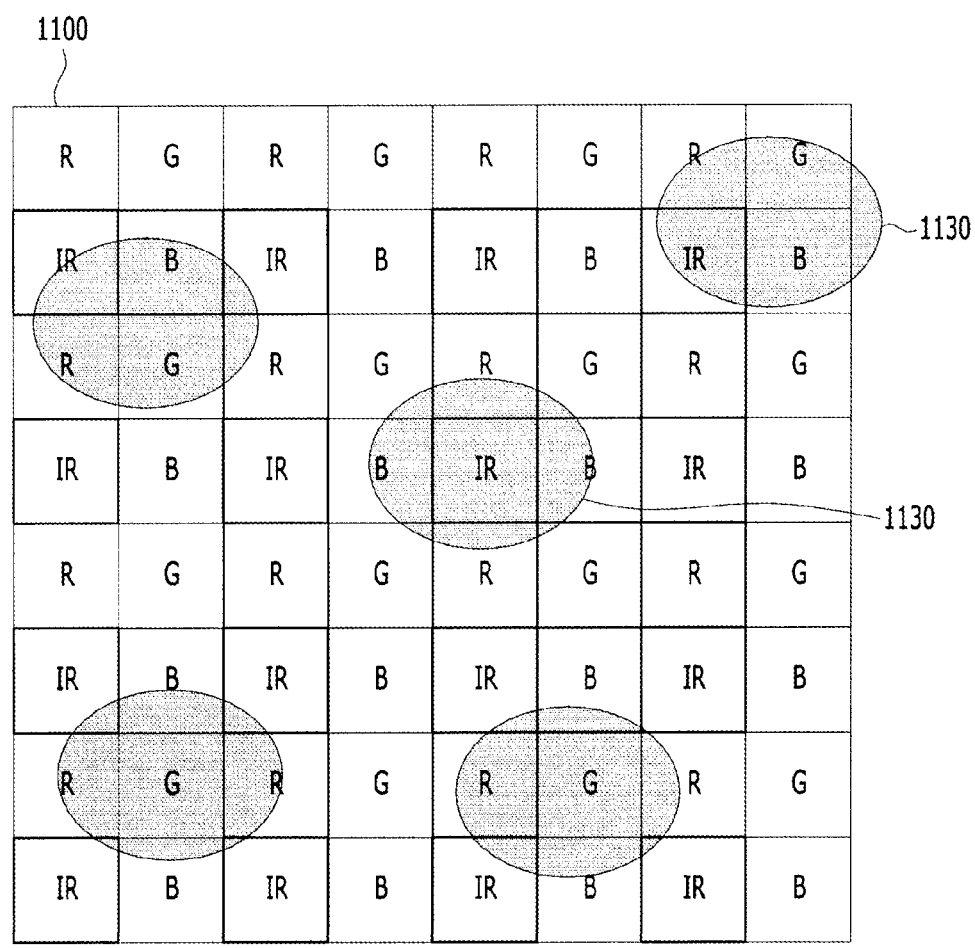
FIG. 29 is a diagram for distribution of an infrared light sensed by a light-receiving unit.
Figure 30:
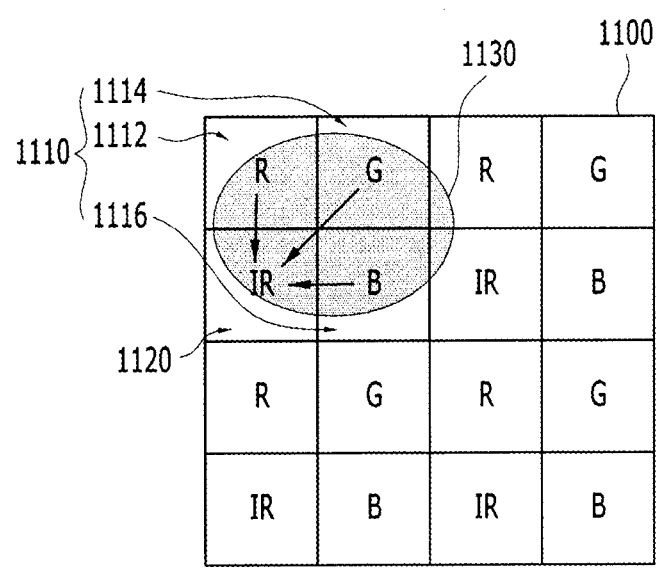
FIG. 30 is a diagram for a bayer pattern in which a first and a second depth image information are composed.

FIG. 28 is a diagram for a bayer pattern in which a first and a second depth image information are not composed, FIG. 29 is a diagram for distribution of an infrared light sensed by a light-receiving unit and FIG. 30 is a diagram for a bayer pattern in which a first and a second depth image information are composed.

As shown in FIG. 28, a light-receiving unit 1100 may include a plurality of unit pixels consisting of a first sensing unit sensing a visible light of a red color, a green color and a blue color wavelength range and a second sensing unit sensing an infrared light.

In this case, if a first image processing unit according to the present invention extracts color image information from the first sensing unit and a second image processing unit according to the present invention extracts second depth image information only from the second sensing unit without extracting first depth image information from the first sensing unit, as shown in FIG. 26, the color image information includes first color image information (R1-R4) extracted by a first pixel of the first sensing unit configured to sense a light of a red color wavelength range, second color image information (G1-G4) extracted by a second pixel of the first sensing unit configured to sense a light of a green color wavelength range and third color image information (B1-B4) extracted by a third pixel of the first sensing unit configured to sense a light of a blue color wavelength range. The depth image information can include depth image information (IR1-IR4) extracted by the second sensing unit only, which is configured to sense an infrared light.

Hence, when a 3D image of a subject is implemented, if the 3D image is implemented by depth image information (IR1-IR4) extracted by the second sensing unit only, sensitivity and contrast of a depth image is small, thereby reducing depth of the 3D image.

For instance, as shown in FIG. 29, a light-receiving unit 1100 can sense an infrared light 1130 reflected from a subject. The infrared light can be reflected to all or a part of a second sensing unit configured to sense the infrared light.

Hence, since overall amount of light of the infrared light capable of being sensed by the light-receiving unit 1100 is small, sensitivity and contrast for a depth image extracted from the infrared light may be deteriorated.

Hence, according to the present invention, sensitivity and contrast of a depth image for a subject can be enhanced in a manner of extracting a noise-free first depth image information via the first sensing unit 1110 shown in FIG. 3 and composing the extracted noise-free first depth image information with second depth image information.

For instance, as shown in FIG. 30, if a light-receiving unit 1100 includes a first sensing unit 1110 including a first pixel 1112 of the first sensing unit 1110 configured to sense a light of a red color wavelength range, a second pixel 1114 of the first sensing unit 1110 configured to sense a light of a green color wavelength range, a third pixel 1116 of the first sensing unit 1110 configured to sense a light of a blue color wavelength range and a second sensing unit 1120 configured to sense an infrared light, the present invention can improve sensitivity and contrast of a depth image for a subject in a manner of extracting noise-free first depth image information via the first sensing unit 1110 and composing the extracted noise-free first depth image information with second depth image information.

Figure 31:
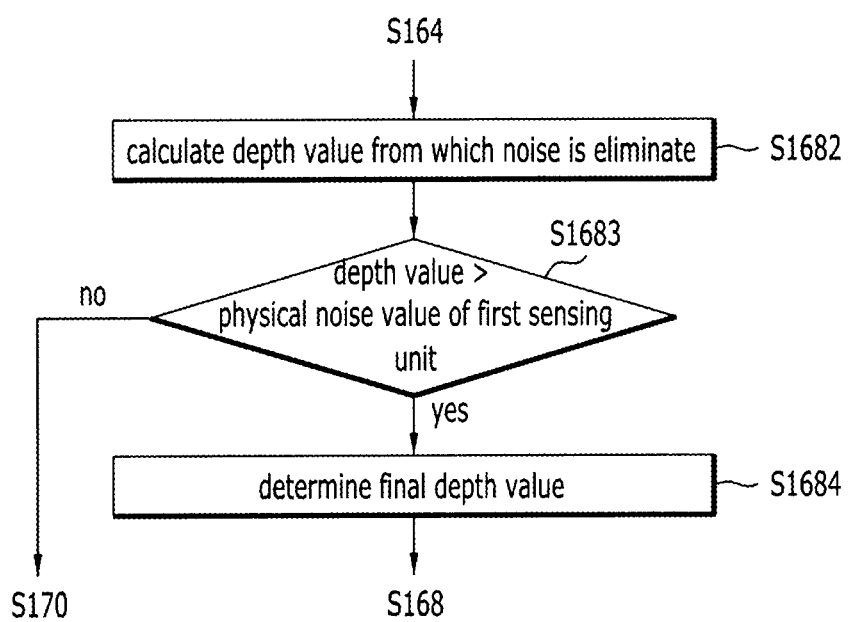
FIG. 31 is a detail flowchart for a method of extracting a second depth image information of FIG. 16.

FIG. 31 is a detail flowchart for a method of extracting a second depth image information of FIG. 16. FIG. 31 is explained with reference to a first depth image extracting unit shown in FIG. 14.

As shown in FIG. 14 and FIG. 31, a noise eliminating unit 2410 can extract a first noise value from an infrared light sensed by a first sensing unit during a first time and can extract a second noise value from an infrared light sensed by a second sensing unit during a second time.

In this case, the first noise value may correspond to a visible light sensed by the first sensing unit during the first time except the infrared light.

And, the second noise value may correspond to a visible light sensed by the first sensing unit during the second time except the infrared light.

Subsequently, the noise eliminating unit 2410 calculates a difference value resulted from subtracting the first noise value from the second noise value and can calculate a noise-free depth value in a manner of multiplying a weighted value by the difference value [S1682].

In this case, the difference value between the second noise value and the first noise value may correspond to a depth value of a pure infrared light from which noise is eliminated.

And, the weighted value may correspond to a value to which a sensitivity characteristic of each pixel of the first sensing unit is reflected.

Figure 32:
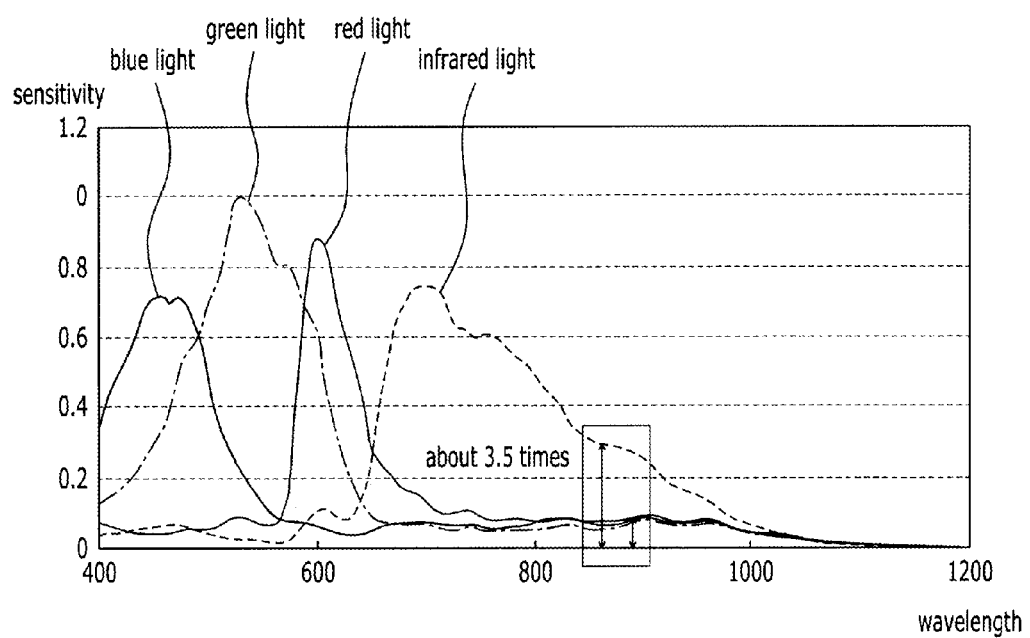
FIG. 32 is a graph showing a light sensitivity characteristic of a first and a second sensing unit.

FIG. 32 is a graph showing a light sensitivity characteristic of a first and a second sensing unit.

As shown in FIG. 32, it is able to know that a light sensitivity characteristic of a first sensing unit and that of a second sensing unit are different from each other according to a wavelength range of a light.

For instance, as shown in FIG. 28, there may exists sensitivity difference of about 3.5 times between sensitivity of each pixel of the first sensing unit and sensitivity of the second sensing unit.

In particular, among a first pixel of the first sensing unit configured to sense a light of a red color wavelength range, a second pixel of the first sensing unit configured to sense a light of a green color wavelength range and a third pixel of the first sensing unit configured to sense a light of a blue color wavelength range, if sensitivity on a red light, sensitivity on a green light and sensitivity on a blue light are similar to each other, it is able to know that sensitivity of the second sensing unit configured to sense an infrared light is greater than the sensitivity of the first sensing unit about 3.5 times.

Hence, when a noise-free depth value is calculated, a difference value between the first noise value and the first noise value is multiplied by a weighted value to eliminate the sensitivity difference.

Subsequently, a comparing unit 2430 can compare the noise-free depth value with a physical noise value of the first sensing unit to find out whether the noise-free depth value is greater than the physical noise value of the first sensing unit [S1683].

Subsequently, if it is determined that the noise-free depth value is greater than the physical noise value of the first sensing unit, a final depth value determining unit 2450 can determine the noise-free depth value as a final depth value for the first depth image information [S1684].

In this case, if the noise-free depth value is greater than the physical noise value of the first sensing unit, it may impact on enhancing sensitivity and contrast of a depth image. Yet, if the noise-free depth value is equal to or less than the physical noise value of the first sensing unit, it does not impact on enhancing sensitivity and contrast of the depth image. Hence, the noise-free depth value can be ignored.

Figure 33:
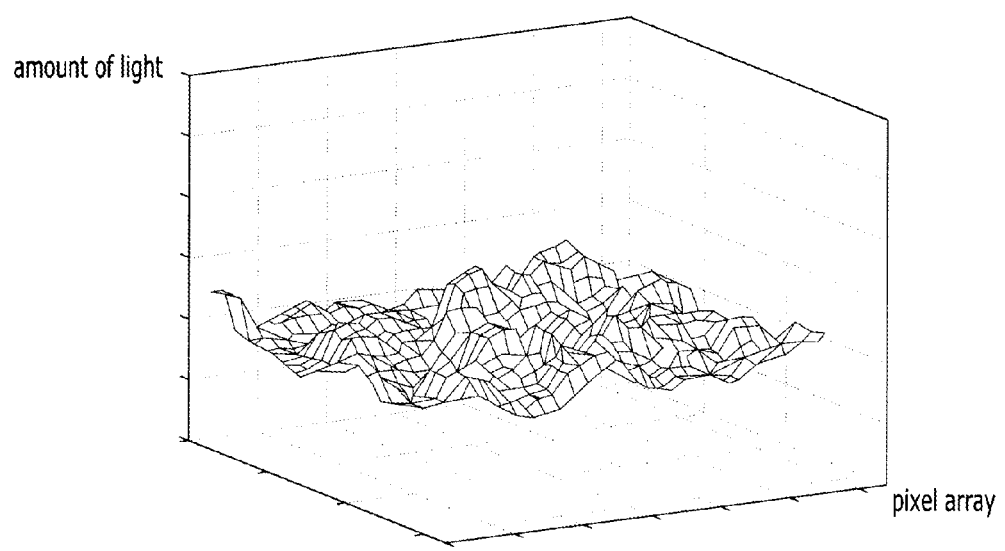
FIG. 33 and FIG. 34 are diagrams comparing contrast of a depth image with each other according to whether a first depth image information and a second depth image information are composed.
Figure 34:
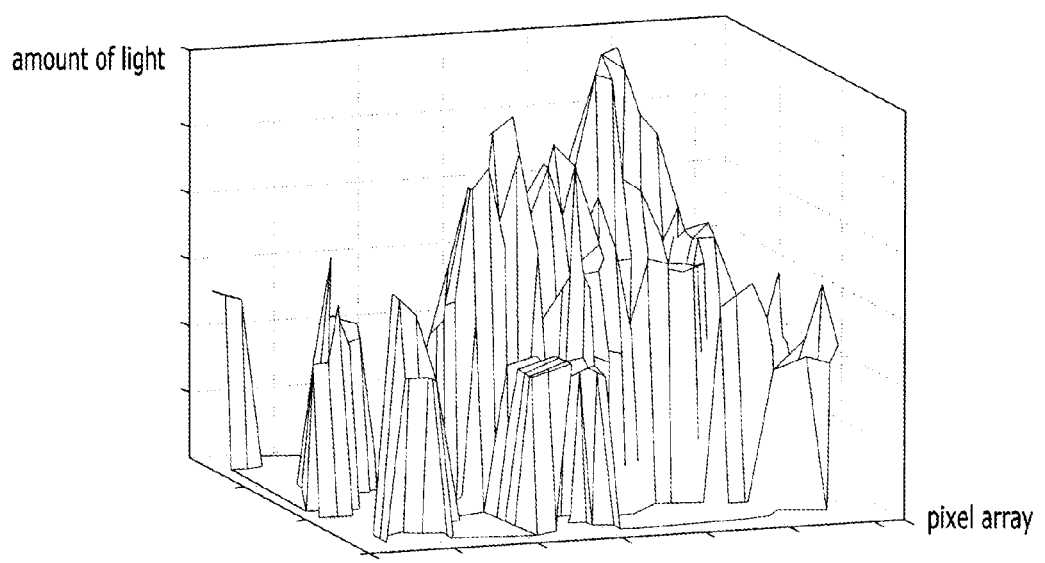

FIG. 33 and FIG. 34 are diagrams comparing contrast of a depth image with each other according to whether a first depth image information and a second depth image information are composed. FIG. 33 is a diagram for a case that the first depth image information and the second depth image information are not composed and FIG. 34 is a diagram for a case that the first depth image information and the second depth image information are composed.

As shown in FIG. 33, if a 3D image of a subject is implemented using the second depth image information only sensed by a second sensing unit 1120 shown in FIG. 3 without composing the first depth image information, depth image information on the subject may be deteriorated.

Yet, as shown in FIG. 34, if the noise-free first depth image information is extracted via the first sensing unit, the second depth image information is extracted via the second sensing unit and then the noise-free first depth image information and the second depth image information are composed, it is able to know that sensitivity and contrast of a depth image for a subject is considerably improved.

Hence, according to the present invention, since it is able to process a color image and a depth image at the same time using a light-receiving unit including a first sensing unit configured to sense a visible light and a second sensing unit configured to sense an infrared light, configuration is simple and 3D image processing time and overall cost can be reduced.

And, according to the present invention, depth of a three dimensional image can be improved by enhancing sensitivity and contrast of a depth image in a manner of increasing exposure time of an infrared light between an end time of a previous frame and a start time of a next frame of color image information, which is increased by converting resolution of a light-receiving unit from a first resolution to a second resolution lower than the first resolution.

And, according to the present invention, when depth image information is obtained, since the depth image information can be extracted from not only an infrared light sensed by a second sensing unit of a light-receiving unit but also an infrared light sensed by a first sensing unit of the light-receiving unit, sensitivity and contrast of a depth image are enhanced, thereby improving depth of a 3D image.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing a 3 dimensional (3D) image, which is processed by a digital device containing a light-receiving unit including a first sensing unit to sense a visible light and a second sensing unit to sense an infrared light and a light-emitting unit to emit the infrared light, comprising the steps of:
   switching by a control unit a resolution of the light-receiving unit from a first resolution to a second resolution which is lower than the first resolution, if the resolution of the light-receiving unit corresponds to the first resolution;
   sensing by the light-receiving unit the visible light and the infrared light from a subject;
   extracting by an image processing unit color image information from the visible light sensed by the first sensing unit of the light-receiving unit during a first time interval;
   extracting by the image processing unit depth image information from the infrared tight sensed by the second sensing unit of the light-receiving unit during a second time interval;
   determining by the control unit whether extraction of both the color image information and the depth image information for the subject is completed; and
   if the extraction of both the color image information and the depth image information for the subject is completed, implementing by a 3D image implementing unit a 3D image of the subject based on the extracted color image information and the depth image information,
   wherein when the resolution of the light-receiving unit is switched from the first resolution to the second resolution which is lower than the first resolution, a time interval between an RGB frame and an IR frame is increased, and
   the control unit controls the light-emitting unit so that the time of turning on the infrared light is increased as much as the increased time interval between the RGB frame and the IR frame.

2. The method of claim 1, the step of switching the resolution of the light-receiving unit from the first resolution to the second resolution which is lower than the first resolution, further comprising the steps of:
   receiving by a receiving unit an image mode request signal;
   if the image mode request signal corresponds to a 3D image mode request signal, checking by the control unit a resolution mode of the light-receiving unit; and
   if the resolution of the light-receiving unit corresponds to the first resolution, switching by the control unit the resolution of the light-receiving unit from the first resolution to the second resolution which is lower than the first resolution.

3. The method of claim 2, further comprising the steps of;
   if the image mode request signal corresponds to a 2D image mode request signal, checking by the control unit the resolution mode of the light-receiving unit; and
   if the resolution of the light-receiving unit corresponds to the second resolution, switching by the control unit the resolution of the light-receiving unit from the second resolution to the first resolution which is higher than the second resolution.

4. The method of claim 1, further comprising the step of not outputting the infrared light by turning off an operation of the light-emitting unit during the first time interval or outputting the infrared light to the subject by turning on the operation of the light-emitting unit during the second time interval according to a control signal of the control unit.

5. The method of claim 4, wherein an operation time of the light-emitting unit corresponds to time between an end time of a previous frame and a start time of a next frame of the color image information.

6. The method of claim 4, wherein the step of not outputting the infrared light during the first time interval and the step of outputting the infrared light during the second time interval are repeatedly performed in turn.

7. The method of claim 1, wherein the step of extracting the color image information during the first time interval and the step of extracting the depth image information during the second time interval are repeatedly performed in turn.

8. The method of claim 1, the step of extracting the color image information during the first time interval, further comprising the steps of:
- detecting by a first detecting unit an amount of light of the visible light sensed by the first sensing unit during the first time interval;
- converting by a first converting unit the detected amount of light of the visible light into an electrical signal; and
- extracting by a color image information extracting unit the color image information from the visible light.

9. The method of claim 1, the step of extracting the depth image information during the second time interval, further comprising the steps of:
- detecting by a second detecting unit an amount of light of the infrared light sensed by the second sensing unit during the second time interval;
- converting by a second converting unit the detected amount of light of the infrared light into an electrical signal; and
- extracting by a depth image information extracting unit the depth image information from the infrared light.

10. A digital device, comprising:
- a receiving unit to receive a 2 dimensional (2D) or a 3 dimensional (3D) image mode request signal;
- a light-receiving unit including a first sensing unit to sense a visible light corresponding to a visible area of a light spectrum and a second sensing unit to sense an infrared light corresponding to an infrared area of the light spectrum from a subject;
- an image processing unit to extract color image information from the first sensing unit during a first time interval and to extract depth image information from the second sensing unit during a second time interval;
- a 3D image implementing unit to implement a 3D image of the subject based on the extracted color image information and the extracted depth image information; and
- a control unit, if the 3D image mode request signal is received, to check a resolution mode of the light-receiving unit, and if a resolution of the light-receiving unit corresponds to a first resolution, to switch the resolution of the light-receiving unit from the first resolution to a second resolution which is lower than the first resolution, the control unit controlling the light-receiving unit, the image processing unit and the 3D image implementing unit,
- wherein when the resolution of the light-receiving unit is switched from the first resolution to the second resolution which is lower than the first resolution, a time interval between an RGB frame and an IR frame is increased, and
- the control unit controls a light-emitting unit so that the time of turning on the infrared light is increased as much as the increased time interval between the RGB frame and the IR frame.

11. The digital device of claim 10, wherein the first sensing unit includes a first pixel to sense a red light, a second pixel to sense a green light and a third pixel to sense a blue light.

12. The digital device of claim 10, wherein the first sensing unit includes a fourth pixel to sense a yellow light, a fifth pixel to sense a cyan light and a sixth pixel to sense a magenta light.

13. The digital device of claim 10, wherein the first sensing unit includes a first pixel to sense a red light, a second pixel to sense a green light, a third pixel to sense a blue light and a seventh pixel to sense one of a white, a yellow, a cyan and a magenta light.

14. The digital device of claim 10, further comprising a light-emitting unit that does not output the infrared light during the first time interval and that outputs the infrared light during the second time interval according to a control signal of the control unit.

15. The digital device of claim 14, wherein an operation time of the light-emitting unit corresponds to time between an end time of a previous frame and a start time of a next frame of the color image information.

16. The digital device of claim 14, further comprising a timer to time the first time in which an operation of the light-emitting unit is turned off and to time the second time in which the operation of the light-emitting unit is turned on according to the control signal of the control unit.

17. The digital device of claim 10, further comprising a storing unit to store the color image information and the depth image information extracted by the image processing unit.

18. The digital device of claim 10, wherein the image processing unit includes a first image processing unit to extract the color image information from the visible light sensed by the first sensing unit during the first time interval and a second image processing unit to extract the depth image information from the infrared light sensed by the second sensing unit during the second time interval.

19. The digital device of claim 18, wherein the first image processing unit includes a first detecting unit to detect an amount of light of the visible light sensed by the first sensing unit during the first time interval, a first converting unit to convert the detected amount of light of the visible light into an electrical signal and a color image information extracting unit to extract the color image information from the visible light.

20. The digital device of claim 18, wherein the second image processing unit includes a second detecting unit to detect an amount of light of the infrared light sensed by the second sensing unit during the second time interval, a second converting unit to convert the detected amount of light of the infrared light into an electrical signal and a depth image information extracting unit to extract the depth image information from the infrared light.

* * * * *